(12) United States Patent
West et al.

(10) Patent No.: US 9,303,590 B2
(45) Date of Patent: Apr. 5, 2016

(54) VARIABLE AREA FAN NOZZLE ACTUATION SYSTEM

(75) Inventors: Randall Ray West, Wichita, KS (US); Joe Everet Sternberger, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 816 days.

(21) Appl. No.: 13/477,250

(22) Filed: May 22, 2012

(65) Prior Publication Data

US 2013/0312387 A1    Nov. 28, 2013

(51) Int. Cl.
*F02K 3/075*   (2006.01)
*F02K 1/09*    (2006.01)
*F02K 1/76*    (2006.01)

(52) U.S. Cl.
CPC . *F02K 3/075* (2013.01); *F02K 1/09* (2013.01); *F02K 1/763* (2013.01); *F02K 1/766* (2013.01)

(58) Field of Classification Search
CPC .............. F02K 1/00; F02K 1/09; F02K 1/54; F02K 1/64; F02K 1/68; F02K 1/72; F02K 1/763; F02K 1/766; F02K 3/02; F02K 3/075; F02K 1/70; B64D 29/06
See application file for complete search history.

(56) References Cited

U.S. PATENT DOCUMENTS

| 3,820,719 | A | 6/1974 | Clark |
| 4,540,305 | A | 9/1985 | Geisthoff et al. |
| 4,922,713 | A | 5/1990 | Barbarin et al. |
| 4,938,731 | A | 7/1990 | Nguyen et al. |
| 5,778,659 | A | 7/1998 | Duesler et al. |
| 6,158,310 | A * | 12/2000 | Goss et al. .................. 81/121.1 |
| 6,592,074 | B2 | 7/2003 | Dehu et al. |
| 6,622,474 | B1 | 9/2003 | Sternberger et al. |
| 6,655,125 | B2 | 12/2003 | Johnson et al. |
| 7,127,880 | B2 | 10/2006 | Lair et al. |
| 7,370,468 | B2 | 5/2008 | Colotte et al. |
| 7,600,384 | B2 | 10/2009 | Chanez et al. |
| 2005/0086927 | A1 * | 4/2005 | Lair et al. ..................... 60/226.2 |

(Continued)

FOREIGN PATENT DOCUMENTS

| FR | 2959488 | 11/2011 |
| WO | WO 2009029401 A2 | 3/2009 |
| WO | WO 2011135217 A1 | 11/2011 |

OTHER PUBLICATIONS

Definition of "decouple," Merriam-Webster Dictionary online, downloaded on Aug. 2, 2015 at 9:09 PM.*

(Continued)

*Primary Examiner* — Ehud Gartenberg
*Assistant Examiner* — Filippo Manfredi
(74) *Attorney, Agent, or Firm* — Hovey Williams LLP

(57) ABSTRACT

An aircraft nacelle having a fixed structure fixed relative to an aircraft pylon, a translating thrust reverser sleeve translatable aftward, relative to the fixed structure, and a translating variable area fan nozzle (VAFN) panel translatable aftward, relative to the translating thrust reverser sleeve. The nacelle may also include a VAFN actuator mounted on the translating thrust reverser sleeve and a VAFN drive unit attached to the fixed structure. The VAFN drive unit may be coupled to drive the VAFN actuator via first and second coupling components when the translating thrust reverser sleeve is stowed. When the translating thrust reverser sleeve is deployed, the first and second coupling components may decouple, disconnecting the VAFN drive unit from the VAFN actuator.

8 Claims, 14 Drawing Sheets

(56) References Cited

U.S. PATENT DOCUMENTS

| | | |
|---|---|---|
| 2007/0095049 A1* | 5/2007 | Eschborn et al. ............... 60/204 |
| 2008/0134664 A1* | 6/2008 | Brannon et al. ............. 60/226.2 |
| 2008/0229851 A1 | 9/2008 | Jones et al. |
| 2009/0013664 A1 | 1/2009 | Jones et al. |
| 2009/0053058 A1 | 2/2009 | Kohlenberg et al. |
| 2009/0090204 A1 | 4/2009 | Jones et al. |
| 2009/0288386 A1 | 11/2009 | Marshall et al. |
| 2011/0072780 A1* | 3/2011 | Somerfield et al. .......... 60/226.2 |
| 2011/0271685 A1 | 11/2011 | West |

OTHER PUBLICATIONS

Definition of "disengage," Merriam-Webster Dictionary online, downloaded on Aug. 2, 2015 at 9:01 PM.*

* cited by examiner

VARIABLE AREA FAN NOZZLE ACTUATION SYSTEM

BACKGROUND

Aircraft engines are typically enclosed within nacelles having translating thrust reverser sleeves which translate aft relative to the nacelle in order to expose a plurality of thrust-reversing cascade vanes to air flowing through the nacelle. When air flowing through the nacelle contacts the exposed thrust reverser cascade vanes, the air flow is directed in an outward and forward direction, reversing the thrust of the aircraft engine.

Some aircraft nacelles have a variable area fan nozzle (VAFN) configuration, with actuatable VAFN structures that slide, pivot, or otherwise open to increase an area of an aft opening or openings through which air may exit the nacelle. These actuatable VAFN structures are usually part of the translating thrust reverser sleeves of the nacelle.

Thrust reverser actuators for the translating thrust reverser sleeves are typically fixed to a torque box or some other fixed component of the nacelle. VAFN actuators for the actuatable VAFN structures may also be fixed to the torque box, but this requires the VAFN actuators to span a majority of a length of the translating thrust reverser sleeve and a telescoping portion of the VAFN actuators must be long enough to accommodate for the aftward translation of the translating thrust reverser sleeve. This configuration undesirably increases the weight of the VAFN actuators.

In other nacelle arrangements, the VAFN actuators are fixed to the translating thrust reverser sleeve, reducing the length and weight of the VAFN actuators. However, transmitting power to these VAFN actuators remains problematic because of the translation of the translating thrust reverser sleeve. Some configurations may use hydraulic fluid hoses, electrical wiring, or pneumatic hoses capable of accommodating translation of the translating thrust reverser sleeve. However, this presents potential maintenance problems, such as chafed hoses or wiring harnesses or premature hose failures due to repeated flexing.

Some configurations use telescoping mechanical interfaces to provide drive power to the VAFN actuators regardless of the position of the translating thrust reverser sleeve. Once again, there is a weight penalty for such a configuration. Additionally, the contact points between sliding components require maintenance and are subject to contact wear that could potentially lead to part failure.

Therefore, there is a need for an improved system and method for actuating VAFN panels that overcomes the limitations of the prior art.

SUMMARY

Embodiments of the present invention solve the above-mentioned problems and provide a distinct advance in the art of variable area fan nozzle (VAFN) actuation for an aircraft nacelle. Some embodiments of the invention include an aircraft nacelle comprising a structure configured to be fixed to a pylon of the aircraft, a translating thrust reverser sleeve, and a variable area fan nozzle (VAFN) panel. The translating thrust reverser sleeve is translatable aftward, relative to the fixed structure, from a first stowed position to a first deployed position. The VAFN panel may be actuatable, relative to the translating thrust reverser sleeve, from a second stowed position to a second deployed position.

The nacelle may also comprise a decoupling drive train having a plurality of actuation components configured for command, control, and/or actuation of the VAFN panel. Some of the actuation components may be fixed relative to the fixed structure and others of the actuation components may be mounted to the translating thrust reverser sleeve. The decoupling drive train may further comprise a first coupling component mounted to the fixed structure and a second coupling component mounted to the translating thrust reverser sleeve. The second coupling component may be configured to electrically, hydraulically, or mechanically couple with the first coupling component when the translating thrust reverser sleeve is in the first stowed position and to decouple with the first coupling component when the translating thrust reverser sleeve is in the first deployed position. The first and second coupling component may electrically, hydraulically, and/or mechanically couple one of the actuation components fixed relative to the fixed structure to another of the plurality of actuation components mounted to the translating thrust reverser sleeve.

In another embodiment of the invention, the aircraft nacelle may comprise a structure configured to be fixed to a pylon of the aircraft, a translating thrust reverser sleeve, and a translating variable area fan nozzle (VAFN) panel. The translating thrust reverser sleeve is translatable aftward, relative to the fixed structure, from a first stowed position to a first deployed position. The translating VAFN panel translatable aftward, relative to the translating thrust reverser sleeve, from a second stowed position to a second deployed position. The nacelle may further comprise a VAFN actuator comprising a fixed element mounted to the translating thrust reverser sleeve and a translatable element fixed to the translating VAFN panel. The VAFN actuator may be configured to actuate the translating VAFN panel between the second stowed position and the second deployed position.

The nacelle may also comprise a VAFN drive unit mounted to the fixed structure and configured to provide electric power, hydraulic force, and/or mechanical force to the VAFN actuator. Furthermore, the nacelle may comprise a decoupling drive train configured to electrically, hydraulically, or mechanically couple the VAFN drive unit and the VAFN actuator when the translating thrust reverser sleeve is in the first stowed position and to decouple the VAFN drive unit from the VAFN actuator when the translating thrust reverser sleeve is in the first deployed position.

In yet another embodiment of the invention, the nacelle may comprise a structure configured to be fixed to a pylon of the aircraft, a translating thrust reverser sleeve, and a translating variable area fan nozzle (VAFN) panel. The translating thrust reverser sleeve is translatable aftward, relative to the fixed structure, from a first stowed position to a first deployed position. The translating VAFN panel translatable aftward, relative to the translating thrust reverser sleeve, from a second stowed position to a second deployed position. The nacelle may further comprise a VAFN actuator comprising a fixed element mounted to the translating thrust reverser sleeve and a translatable element fixed to the translating VAFN panel and configured to actuate the translating VAFN panel between the second stowed position and the second deployed position. Additionally, the nacelle may comprise a VAFN drive unit mounted to the fixed structure and configured to provide electric power, hydraulic force, and/or mechanical force to the VAFN actuator.

The nacelle may also comprise first and second coupling components. The first coupling component may be mounted to the fixed structure and electrically, hydraulically, and/or mechanically coupled with the VAFN drive unit. The second coupling component may be electrically, hydraulically, and/or mechanically coupled with the VAFN actuator and mounted to the translating thrust reverser sleeve. The first coupling component and the second coupling component may be configured to electrically, hydraulically, and/or mechanically couple with each other when the translating thrust reverser sleeve is in the first stowed position and to decouple with each other when the translating thrust reverser sleeve is in the first deployed position. The nacelle may also comprise a position locking device coupling the second coupling component with the VAFN actuator. The position locking device may be configured to impede actuation of the VAFN actuator when the second coupling component is decoupled from the first coupling component.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 22:
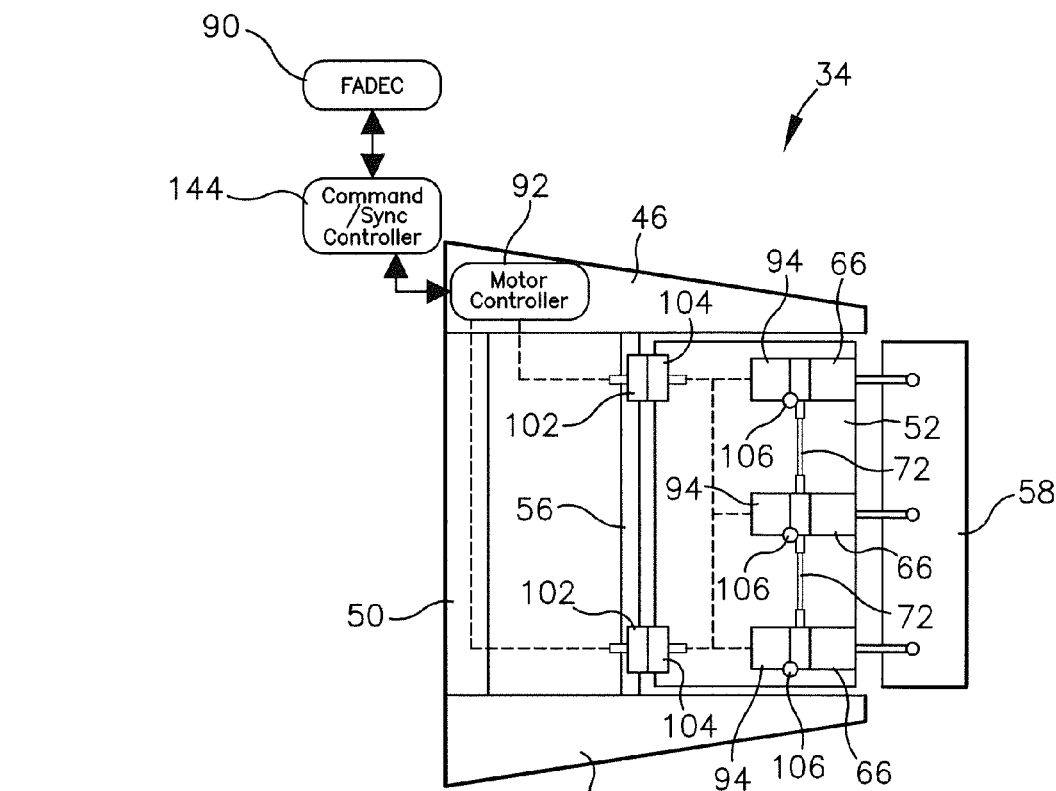
FIG. 22 is a schematic cross-sectional view of an electrical embodiment of the thrust reverser half of FIG. 12, illustrating electric contact-type first and second coupling components electrically coupling the motor controller with motors mounted on the translating thrust reverser sleeve with the translating thrust reverser sleeve in the stowed position.
Figure 24:
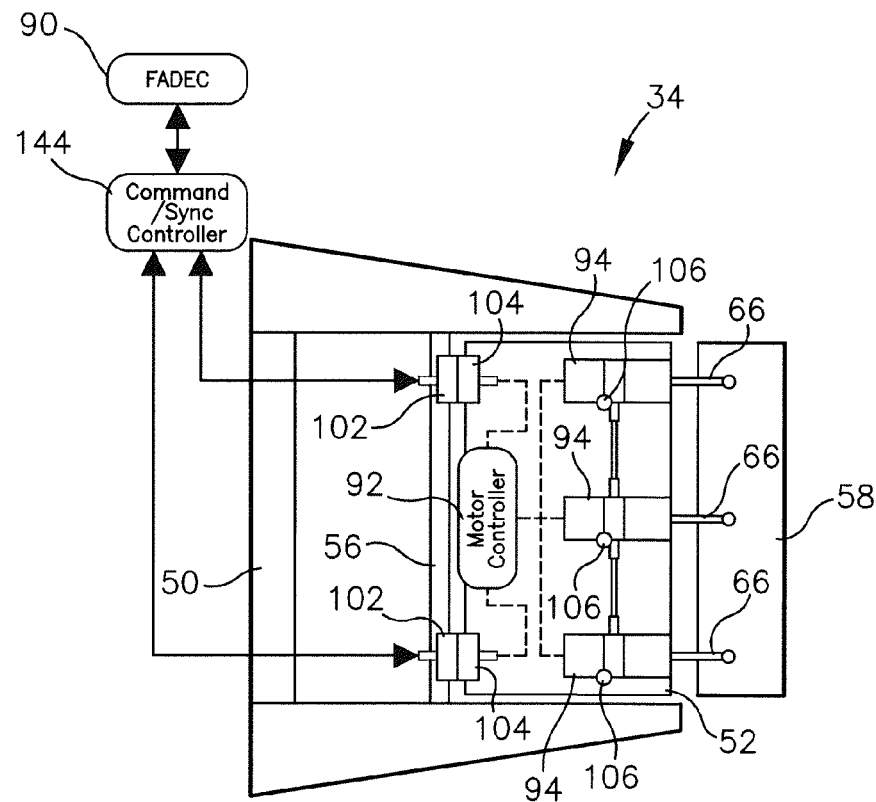
Figure 25:
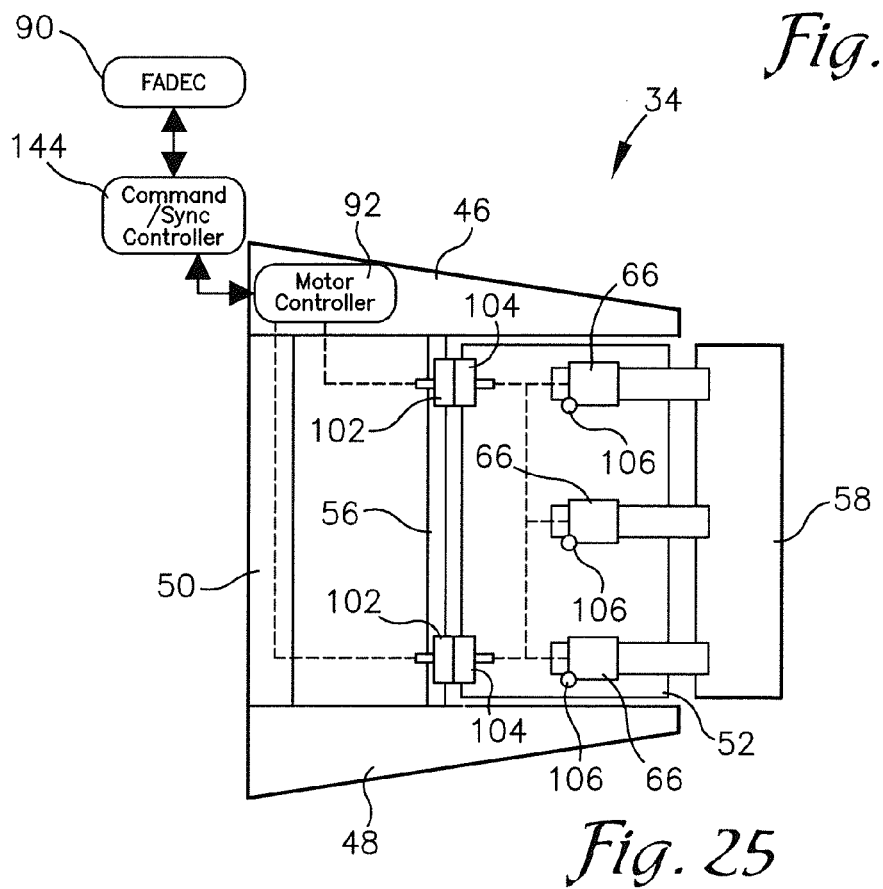

FIG. 24 is a schematic cross-sectional view of an alternative embodiment of the thrust reverser half of FIG. 22 with the electric contact-type first and second coupling components electrically coupling the motor controller mounted on the translating thrust reverser sleeve to the command/sync controller or FADEC system; and FIG. 25 is a schematic cross-sectional view of an alternative embodiment of the thrust reverser half of FIG. 22 with contactless first and second coupling components using induction coupling to provide electrical power to the VAFN actuators.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A nacelle 10, constructed in accordance with an embodiment of the present invention, is illustrated in FIGS. 1-25 and broadly comprises a translating thrust reverser sleeve 52, a variable area fan nozzle (VAFN) panel 58, and a decoupling drive train 100, as later described herein. The decoupling drive train 100 may provide mechanical actuation, hydraulic actuation, or electrical power for actuating the VAFN panel 58 when the translating thrust reverser sleeve 52 is in a stowed position and may decouple a command, control, and/or power source from an actuator of the VAFN panel 58 when the translating thrust reverser sleeve 52 is in a deployed position, as later described herein.

Figure 1:
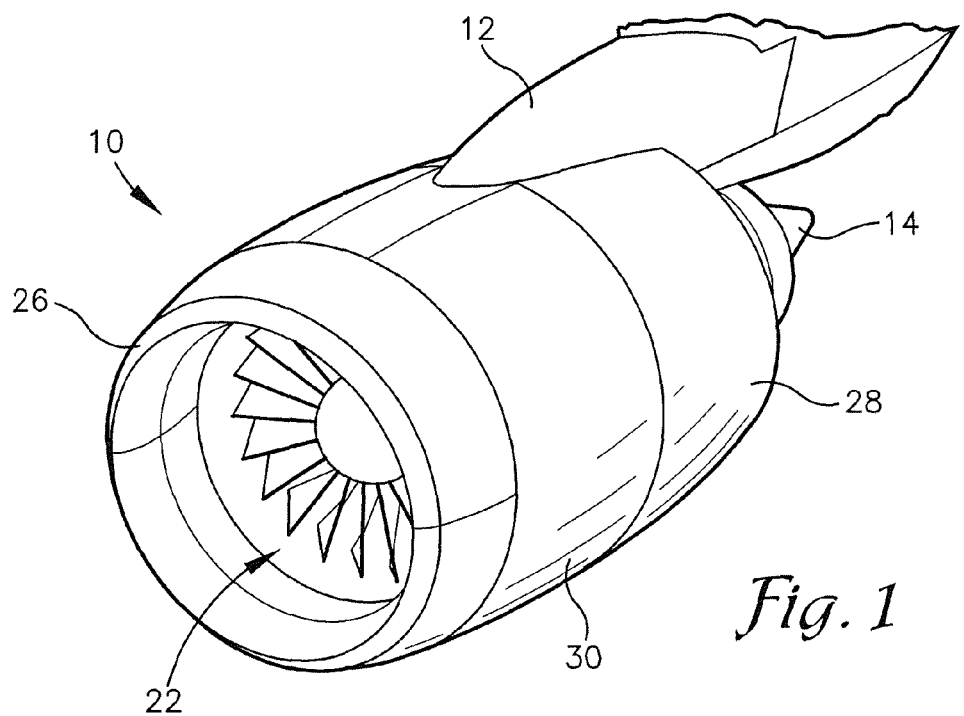
FIG. 1 is a perspective view of an aircraft nacelle constructed in accordance with an embodiment of the present invention.
Figure 2:
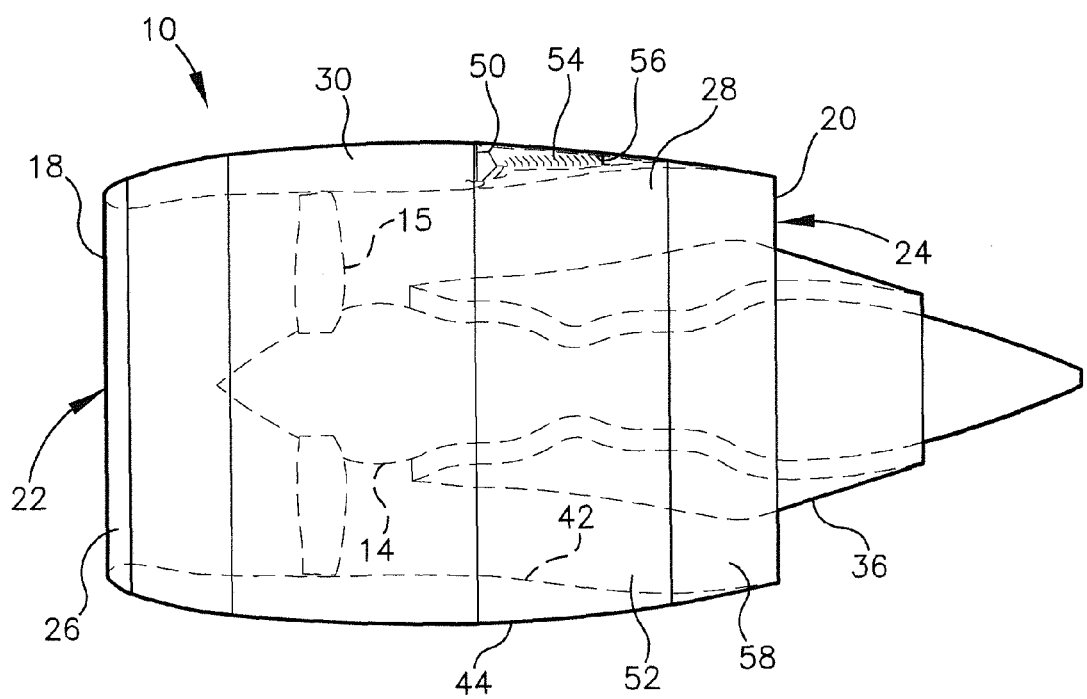
FIG. 2 is an elevation view of the nacelle of FIG. 1.
Figure 3:
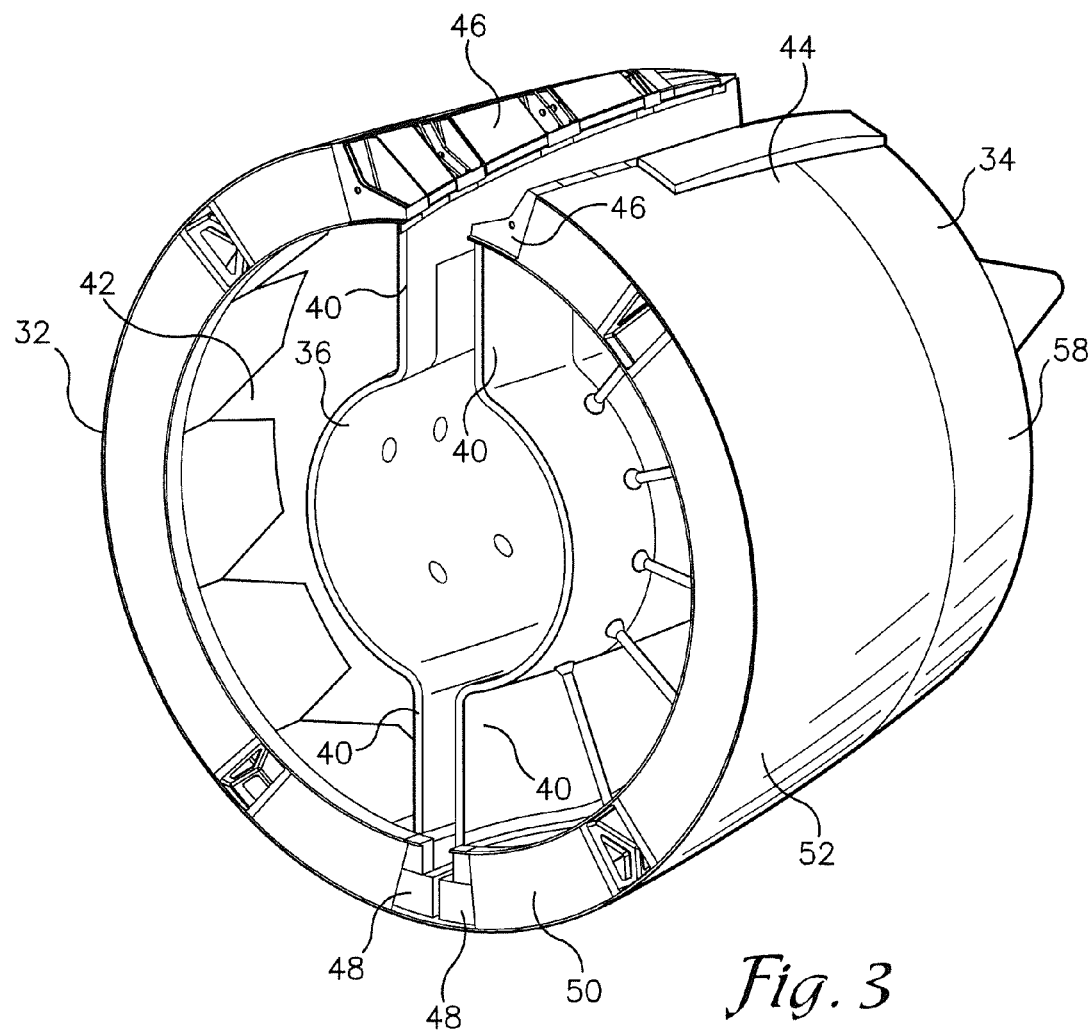
FIG. 3 is a perspective view of a thrust reverser portion of the nacelle of FIG. 1.

As illustrated in FIGS. 1-6, the nacelle 10 may be attached to a pylon 12, and configured to surround an aircraft engine 14, fan 15, and fan case 16. The pylon 12 may extend from an aircraft wing or other portions of an aircraft and the aircraft engine 14 may be fixed to the nacelle 10 and/or the pylon 12. As illustrated in FIG. 2, the nacelle 10 may be a hollow structure having a forward end 18 and an aft end 20, with a forward opening 22 (inlet) at the forward end 18 and an aft opening 24 (outlet or nozzle) at the aft end 20 thereof. In some embodiments of the invention, the nacelle 10 may comprise an inlet lip 26 at the forward end 18 of the nacelle 10, a thrust reverser portion 28 at the aft end 20 of the nacelle 10, and a fan cowl portion 30 extending between the inlet lip 26 and the thrust reverser portion 28. The thrust reverser portion 28 may be divided into two thrust reverser halves 32,34 which join with each other at the pylon 12 or a top joint and at a bottom joint opposite of the pylon 12 or top joint.

The nacelle 10 may comprise a fan duct inner wall 36 configured to be positioned proximate to and at least partially surround the engine 14. The nacelle 10 may also comprise a fan duct outer wall 42 located outward of the fan duct inner wall 36 and spaced a distance apart from the fan duct inner wall 36 by flanges 40 extending radially from the inner cowl 36. The space between the fan duct inner and outer walls 36,42 may be referred to herein as a fan duct. The nacelle 10 may also comprise an outer cowl 44 spaced apart from and connected to the fan duct outer wall 42 by the inlet lip 26 at the forward end 18 of the nacelle 10. Furthermore, the fan duct outer wall 42 and the outer cowl 44 may converge with each other at the aft end 20 of the nacelle 10 into a single aft edge, as illustrated in FIG. 2. The fan duct outer wall 42 of each of the thrust reverser halves 32,34 may also comprise a hinge beam 46 configured for connection with the pylon 12 and a latch beam 48, wherein the latch beams 48 of the two thrust reverser halves 32,34 are configured to be detachably attached to each other.

The nacelle 10 may further comprise a torque box 50 or beam extending between the fan duct outer wall 42 and the outer cowl 44 at or proximate to a point where the thrust reverser portion 28 meets the fan cowl portion 30. The thrust reverser portion 28 may comprise a translating thrust reverser sleeve 52 slidable forward and aft relative to the torque box 50. For example, the translating thrust reverser sleeve 52 may include an aft portion of the inner fan duct outer wall 42 and the outer cowl 44 and may be slidably connected to the latch beam 48 and hinge beam 46 by way of a thrust reverser track and/or a thrust reverser slider. Additional tracks and sliders may be fixed to the hinge and latch beams 46,48 and/or a cascade support ring (described below) mid-way between the hinge beam 46 and the latch beam 48. However, any known methods of guiding and supporting the translating thrust reverser sleeve 52 relative to fixed portions of the nacelle 10 may be used without departing from the scope of the invention. The translating thrust reverser sleeve 52 may have a first stowed position in which the translating thrust reverser sleeve 52 rests substantially adjacent to the torque box 50 and a second deployed position in which the translating thrust reverser sleeve 52 is translated a distance away from the torque box 50.

Figure 5:
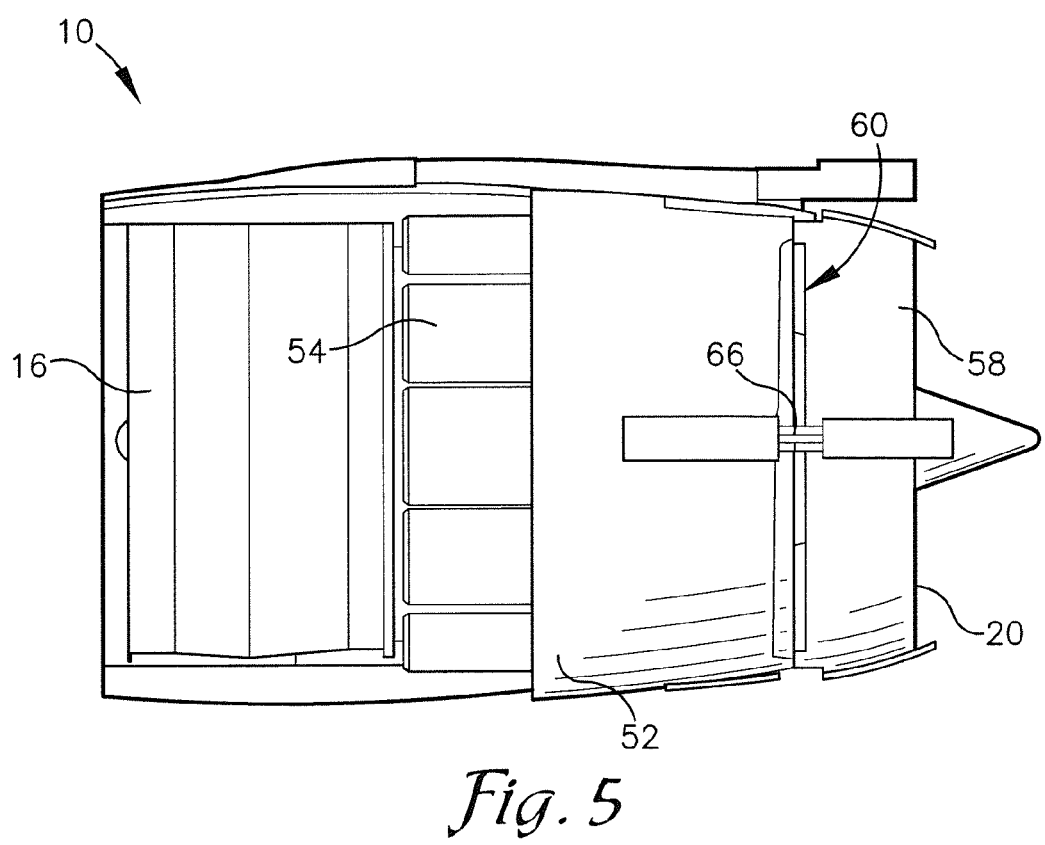
FIG. 5 is an elevation view of the nacelle of FIG. 4 with the translating thrust reverser sleeve and the translating VAFN panel in a deployed position.
Figure 6:
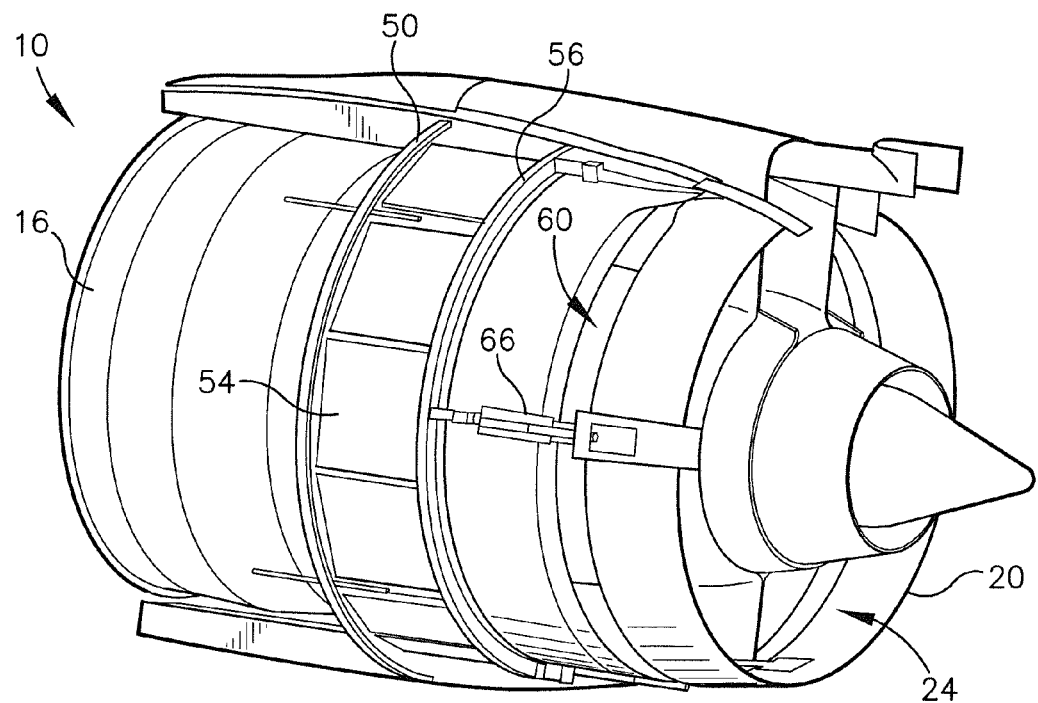
FIG. 6 is a perspective view of the nacelle of FIG. 5 with an outer cowl of the nacelle removed.

The thrust reverser portion 28 may also comprise a plurality of cascade vane baskets or cascade vane panels 54 fixed to the torque box 50 and/or a cascade support ring 56, as illustrated in FIGS. 5 and 6. The cascade support ring 56 may be attached to and extend from the latch beam 48 to the hinge beam 46. In some embodiments of the invention, the torque box 50 may be positioned forward of the cascade vane panels 54 and the cascade support ring 56 may be positioned aft of the cascade vane panels 54. In alternative embodiments of the invention, the cascade vane panels 54 may be attached to the translating thrust reverser sleeve 52.

Figure 4:
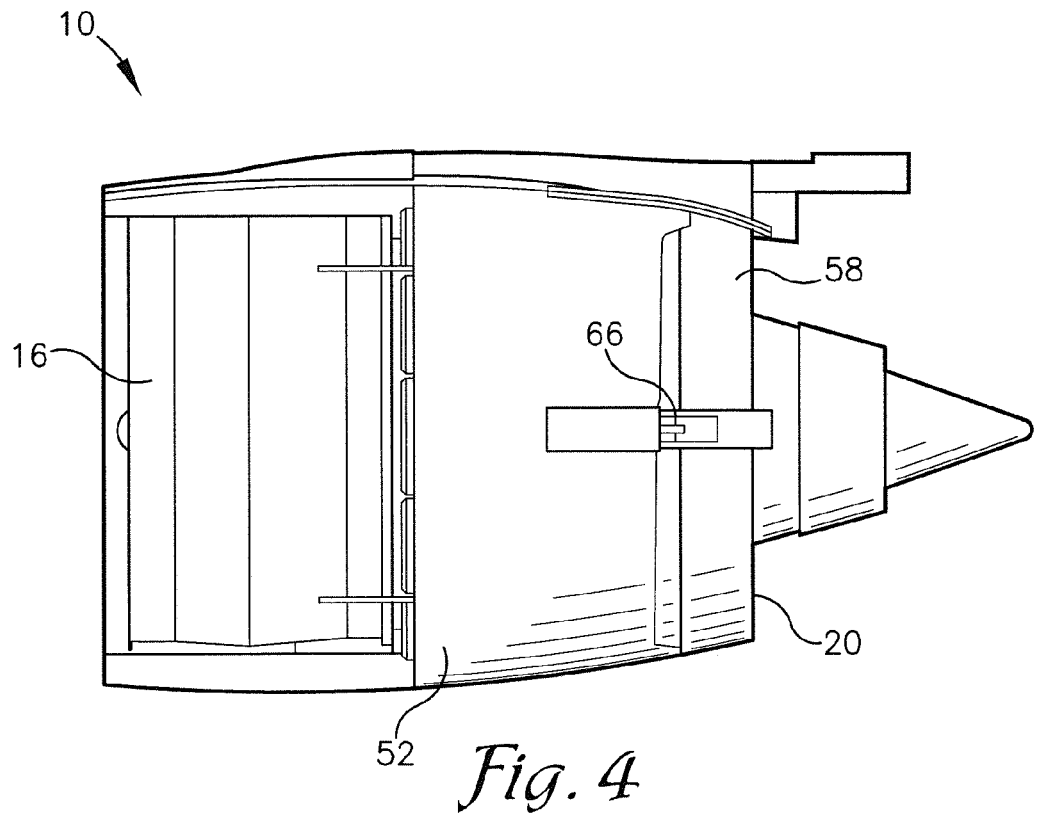
FIG. 4 is an elevation view of the nacelle of FIG. 1 with a fan case portion thereof removed and a translating thrust reverser sleeve and translating variable area fan nozzle (VAFN) panel in a stowed position.

The cascade vane panels 54 may be configured to rest between the fan duct outer wall 42 and the outer cowl 44 of the translating thrust reverser sleeve 52 in its stowed position, as illustrated in FIG. 4, and to be exposed to air from within the fan duct when the translating thrust reverser sleeve 52 is in its deployed position, as illustrated in FIG. 5. The cascade vane panels 54 may each comprise a plurality of thrust-reversing vanes shaped and positioned to direct air flowing in a forward-to-aft direction through the fan duct in a generally outward and forward direction when the translating thrust reverser sleeve 52 is in the deployed position.

Figure 7:
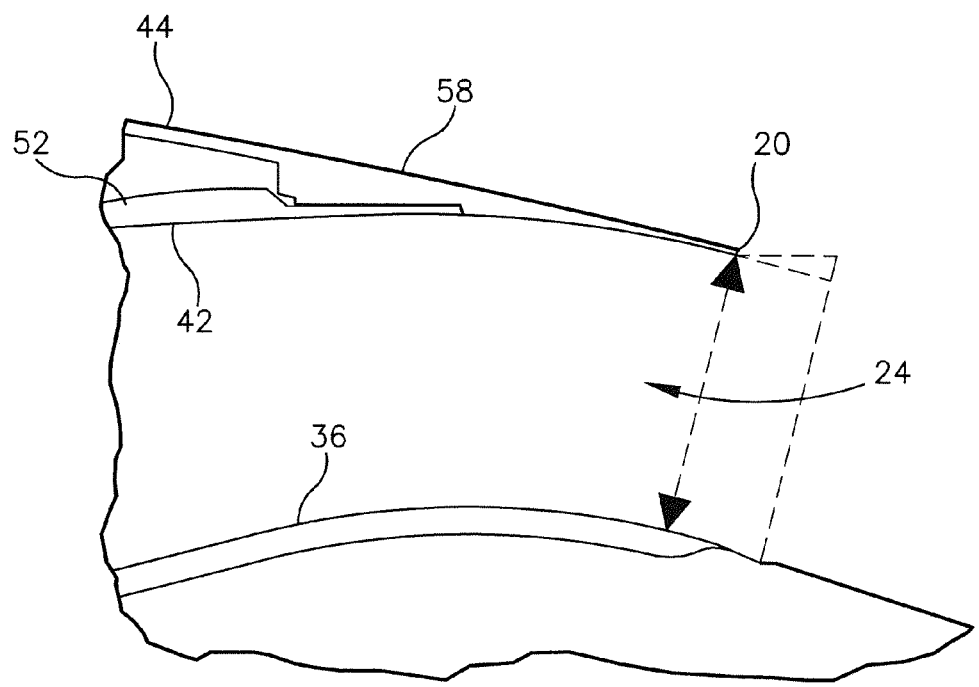
FIG. 7 is a cross-sectional view of an aft end of an alternative embodiment of the translating thrust reverser sleeve and the translating VAFN panel of FIG. 4 in the stowed position.
Figure 8:
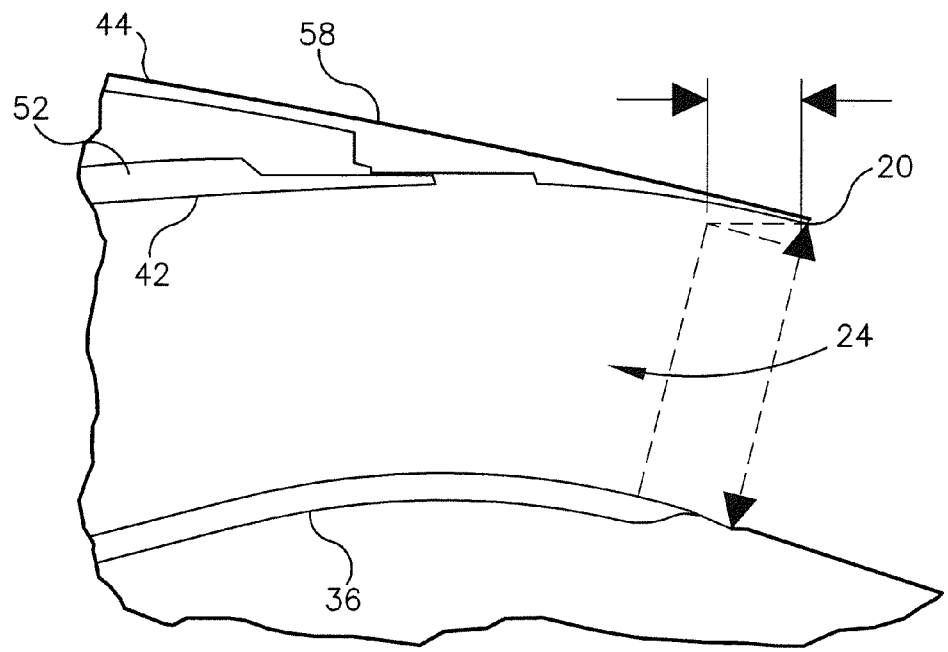
FIG. 8 is a cross-sectional view of the aft end of the translating VAFN panel of FIG. 7 in the deployed position.

The portion of the outer cowl 44 on the translating thrust reverser sleeve 52 may comprise the VAFN panel 58 at the aft end 20 of the nacelle 10 configured to actuate (e.g., translate forward and aft) relative to the translating thrust reverser sleeve 52. Therefore, the VAFN panel 58 also has its own deployed position and stowed position. Actuation of the VAFN panel 58 on each thrust reverser half 32,34 to its deployed position increases the aft opening 24 or nozzle area of the nacelle 10, as illustrated in FIGS. 7 and 8. Specifically, FIG. 7 illustrates the VAFN panel 58 in the stowed position and FIG. 8 illustrates the VAFN panel 58 in a deployed position. The stowed position may provide for a minimum fan exit area and the deployed position may provide a maximum fan exit area. The VAFN panel 58 may be positioned at any intermediate position between the stowed and deployed positions to modulate fan duct flow for a variety of engine operation conditions. In some embodiments of the invention, the VAFN panel 58 may be translatable forward and aft, and VAFN sliders and tracks, similar to the thrust reverser tracks and sliders described above for guiding and slidably supporting the translating thrust reverser sleeve 52, may be used to slidably attach and support the VAFN panel 58 to the translating thrust reverser sleeve 52.

In an alternative embodiment of the invention, as illustrated in FIGS. 4-6, the VAFN panel 58 may be an aft portion of the translating thrust reverser sleeve 52, including aft-most portions of the fan duct outer wall 42 and the outer cowl 44. Translation of the VAFN panel 58 in this embodiment of the invention may form a gap or port 60 between the VAFN panel 58 and a remaining portion of the translating thrust reverser sleeve 52 located forward of the VAFN panel 58. Airflow through the nacelle 10 may then exit through the now larger area of the aft opening 24 at the aft end 20 of the nacelle 10 and through the port 60 formed by deploying the VAFN panel 58. This and other methods of actuating portions of the nacelle 10 to increase and decrease a total nozzle area or outlet area for airflow through the nacelle 10 may be used without departing from the scope of the invention. The VAFN configurations used herein are merely examples of many types of apparatuses that vary nozzle exit area through manipulation of the nacelle's outer aerodynamic surfaces. For example, in some embodiments of the invention, the VAFN panel 58 may be replaced with flaps or tabs which may be actuated to open and close to vary nozzle exit area.

The nacelle 10 may further comprise several actuation and control systems, including a system configured for actuating forward and aft translation of the translating thrust reverser sleeve 52 and a system configured for actuating the VAFN panel 58. The actuation and control system for the translating thrust reverser sleeve 42 may comprise thrust reverser actuators 64, thrust reverser drive units 68, and synchronous shafts 98 configured for connecting and/or synchronizing operation of at least some of the thrust reverser actuators 64. The actuation and control system for the VAFN panel 58 may comprise position sensors 62, VAFN actuators 66, VAFN drive units 70, and/or interconnect shafts 72 configured for connecting and/or synchronizing operation of at least some of the VAFN actuators 66.

The thrust reverser actuators 64 may include various linear or rotary actuators, such as ACME screw or linear actuators, ball-screw type linear actuators, electric linear motor actuators, hydraulic actuators, jack-screw type actuators, rack and pinion actuators, etc. In some embodiments of the invention, the thrust reverser actuators 64 may comprise a first thrust reverser actuator (TRA) element 82 fixed to a non-translating component of the nacelle 10 or the pylon 12 and a second TRA element 84 fixed to the translating thrust reverser sleeve 52 and configured to translate toward and away from the first TRA element 82. In some alternative embodiments of the invention, the second TRA element 84 may be replaced with any translating, rotating, and/or pivoting elements without departing from the scope of the invention. The first TRA element 82 of the thrust reverser actuators 64 may be mechanically, electrically, and/or hydraulically connected to each other via one or more of the synchronous shafts 98. Likewise, one or more of the thrust reverser actuators 64 may be mechanically, electrically, and/or hydraulically coupled with and driven by the thrust reverser drive unit 68.

Figure 9:
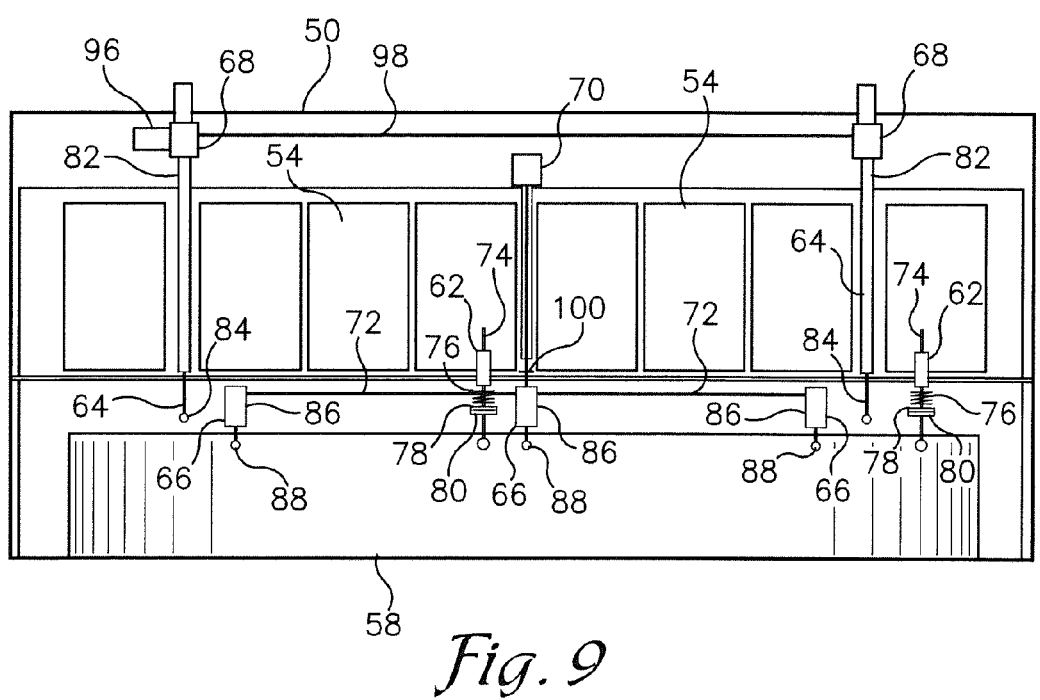
FIG. 9 is a schematic side view of the translating thrust reverser sleeve of FIG. 7, with the translating thrust reverser sleeve and the translating VAFN panel in the stowed position.
Figure 10:
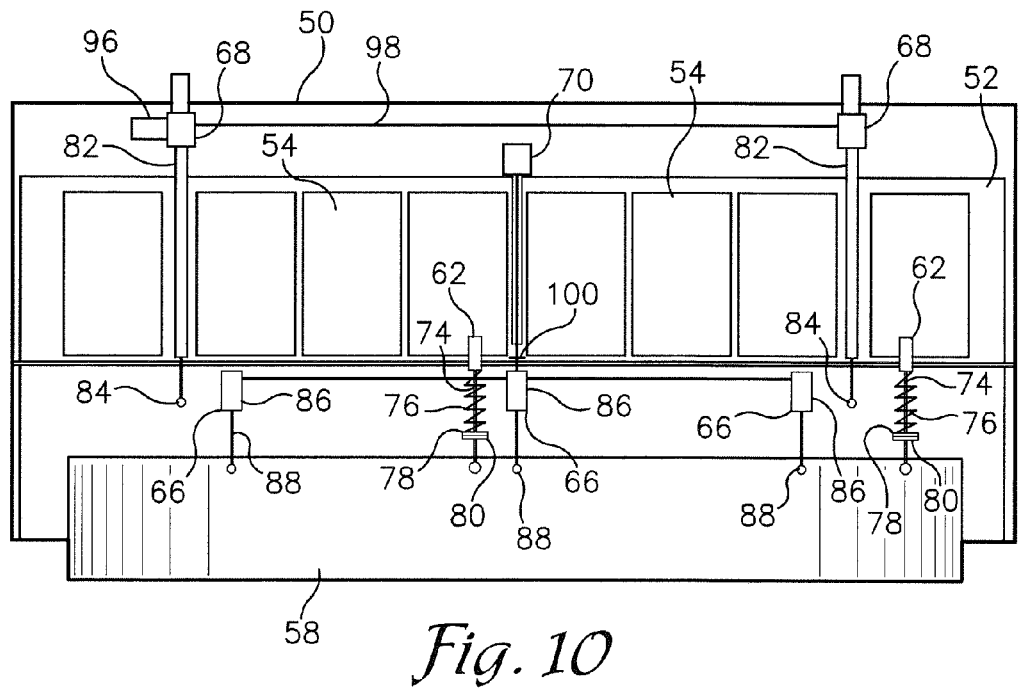
FIG. 10 is a schematic side view of the translating thrust reverser sleeve of FIG. 7, with the translating thrust reverser sleeve in the stowed position and the translating VAFN panel in the deployed position.
Figure 11:
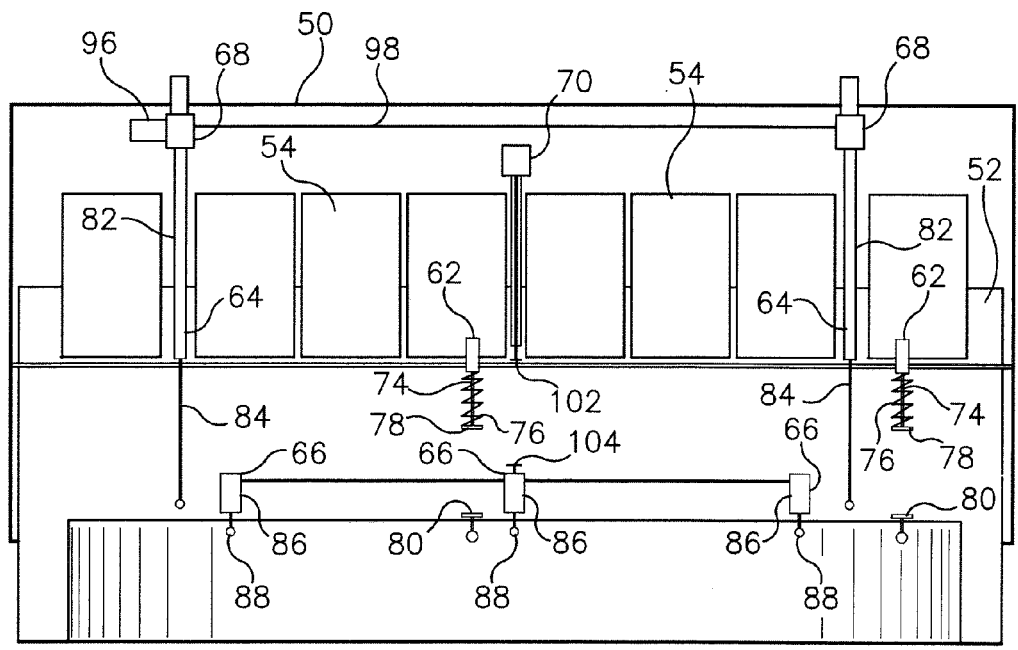
FIG. 11 is a schematic side view of the translating thrust reverser sleeve of FIG. 7, with the translating thrust reverser sleeve in the deployed position and the translating VAFN panel in the stowed position.

The thrust reverser drive units 68 may comprise various electrical, hydraulic, and/or mechanical components such as motors, gearboxes, and transmission shafts and may be communicably and/or electrically coupled with various aircraft command and control systems. The thrust reverser drive unit 68 may also include a motor controller and/or a motor configured for providing mechanical, electrical, electro-mechanical, hydro-mechanical, and/or hydraulic actuation to the thrust reverser actuators 64. The thrust reverser drive units 68 may be fixed to a non-translating element of the nacelle 10, such as the latch beam 48, the hinge beam 46, the torque box 50, or some other component fixed relative to the torque box 50. Some of the thrust reverser drive units 68 may further comprise a manual drive 96 for manually actuating the translating thrust reverser sleeve 52 for maintenance purposes, as illustrated in FIGS. 9-11.

The synchronous shafts 98 may be configured for synchronizing and/or driving operation of some or all of the thrust reverser actuators 64. The synchronous shafts 98 may extend between the thrust reverser actuators 64 to mechanically, electrically, and or hydraulically link the actuation of the thrust reverser actuators 64. In some embodiments of the invention, the synchronous shafts 98 may be driven via gears or other connection links by one or more of the thrust reverser actuators 64. In some embodiments of the invention, at least one of the synchronous shafts 98 may be driven via one of the thrust reverser drive units 68, and the rotation of the synchronous shafts 98 may cause at least one of the thrust reverser actuators 64 to rotate or otherwise actuate. The synchronous shafts 98 may additionally or alternatively include electrical or hydraulic links between some or all of the thrust reverser actuators 64. Furthermore, some of the synchronous shafts 98 may additionally or alternatively include electrical or hydraulic links between the thrust reverser drive units 68 and the thrust reverser actuators 64.

Regarding the actuation and control system for the VAFN panel 58, the position sensors 62 may be configured for sensing positions (e.g., stowed or deployed) of the VAFN panel 58. The position sensors 62 may be electrical, optical, infrared, radio-frequency transmitter-receiver pairs, or any other devices capable of sensing a position of one component relative to another. For example, as illustrated in FIGS. 9-11, at least one of the position sensors 62 may be a linear variable transducer (LVT) device mounted on to the cascade support ring 56 or another non-translating element of the nacelle 10. The LVT device may comprise a translating sensor 74 having a resilient member 76 associated therewith, such as a spring, with a first LVT target 78 located at an aft end of the translating sensor 74. A second LVT target 80 may be mounted to the VAFN panel 58 and may engage the first LVT target 78 when the translating thrust reverser sleeve 52 is in the stowed position. For example, the LVT device may be positioned such that when the VAFN panel 58 is in its stowed positions, the translating sensor 74 is in a retracted position, the first and second LVT targets 78,80 are in contact with each other, and the resilient member 76 or spring is compressed, as illustrated in FIG. 9. When the VAFN panel 58 is in the deployed position, the translating sensor 74 is in an extended position, the first and second LVT targets 78,80 are in contact with each other, and the resilient member 76 or spring is not fully compressed, as illustrated in FIG. 10. Finally, when the translating thrust reverser sleeve 52 is in the deployed position, as illustrated in FIG. 11, the first and second LVT targets 78,80 are separated from each other. The ability of the LVT targets 78,80 to separate from each other allows a shorter length to be chosen for the translating sensor 74, since the position sensor doesn't have to extend as far as the translating thrust reverser sleeve 52. The position of the translating sensor 74 and/or the contact of the LVT targets 78,80 may be transmitted back to a cockpit of the aircraft or to various other monitoring, command, and control systems of the aircraft to indicate the position of the VAFN panel 58.

The VAFN actuators 66 may include various linear or rotary actuators, such as ACME screw or linear actuators, ball-screw type linear actuators, electric linear motor actuators, hydraulic actuators, jack-screw type actuators, rack and pinion actuators, etc. For example, the VAFN actuators 66 may comprise a fixed element 86 fixed to the translating thrust reverser sleeve 52 and a translating element 88 fixed to the VAFN panel 58. In some embodiments of the invention, the VAFN actuators 66 may further comprise an actuator drive shaft configured to rotate relative to the fixed element 86 and coupled with the translating element 88 in such a manner to transfer the rotary motion of the actuator drive shaft into a translating motion of the translating element 88. However, the translating element 88 may be replaced with any translating, rotating, and/or pivoting element without departing from the scope of the invention. Each of the thrust reverser halves 32,34 may include at least one of the VAFN actuators 66. In some embodiments of the invention, each of the thrust reverser halves 32,34 may have two, three, or four VAFN actuators 66 mounted thereto. The VAFN actuators 66 may be mechanically, electrically, and or hydraulically connected with each other via one or more of the interconnect shafts 72, as later described herein. Likewise, one or more of the VAFN actuators 66 may be mechanically, electrically, and/or hydraulically coupled with and driven by the VAFN drive unit 70. Specifically, a decoupling drive train 100 may mechanically, hydraulically, and/or electrically connecting the VAFN drive unit 70 with the VAFN actuators 66, as described below and illustrated in FIGS. 12-14.

Figure 19:
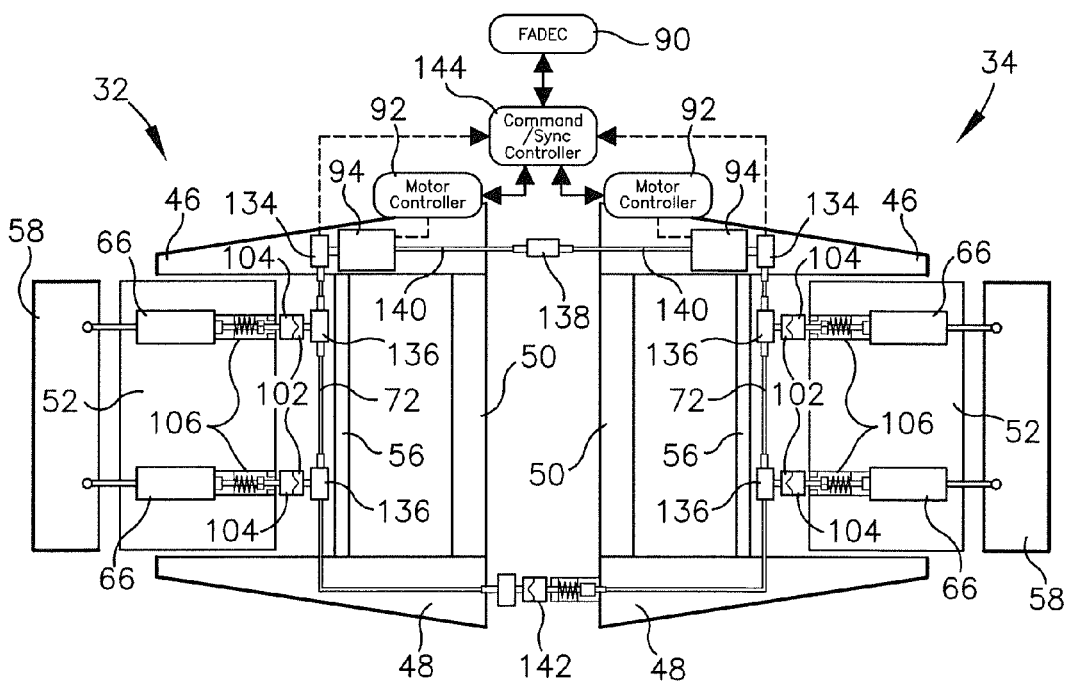
FIG. 19 is a schematic cross-sectional view of the two thrust reverser halves of FIG. 18 with the redundant motors removed and single motors on each of the thrust reverser halves rotatably coupled by a cross-over power transmission shaft at hinge beams of the thrust reverser halves and by self-aligning coupling components at latch beams of the thrust reverser halves.

The VAFN drive units 70 may comprise various electrical, hydraulic, and/or mechanical components such as motors, gearboxes, and transmission shafts. The VAFN drive units 70 may be communicably and/or electrically coupled with various aircraft command and control systems, such as a full authority digital engine control (FADEC) system 90 of the aircraft, as illustrated in FIG. 19. The VAFN drive unit 70 may also include a motor controller 92 and/or a motor 94 configured for providing mechanical electrical and/or hydraulic actuation to the VAFN actuators 66, as illustrated in FIG. 19. The VAFN drive units 70 may be fixed to a non-translating element of the nacelle 10, such as the latch beam 48, the hinge beam 46, the torque box 50, or some other component fixed relative to the torque box 50.

The type of VAFN drive units 70 used may depend on the type of actuators to be driven thereby. For example, the VAFN drive unit 70 may be a gear motor used in conjunction with a jack screw-type VAFN actuator, with the gear motor rotating the actuator drive shaft connected with the translating element 88 to extend or retract the translating element 88 relative to its fixed element 86. In some embodiments of the invention, multiple VAFN drive units 70 may be used for redundancy, in case one of the VAFN drive units 70 fails, and/or to provide additional power or actuation force in some instances.

The interconnect shafts 72 may be configured for synchronizing and/or driving operation of some or all of the VAFN actuators 66. The interconnect shafts 72 may be rigid or flexible, depending on the installation thereof. Some of the interconnect shafts 72 may extend between the VAFN actuators 66 to mechanically, electrically, and or hydraulically link the actuation of the VAFN actuators 66. In some embodiments of the invention, the interconnect shafts 72 may be driven via gears or other connection links by one or more of the VAFN actuators 66. In some embodiments of the invention, at least one of the interconnect shafts 72 may be driven via the VAFN drive unit 70, and the rotation of the interconnect shafts 72 may cause at least one of the VAFN actuators 66 to rotate or otherwise actuate. The interconnect shafts 72 may additionally or alternatively include electrical or hydraulic links between some or all of the VAFN actuators 66. Furthermore, some of the interconnect shafts 72 may additionally or alternatively include electrical or hydraulic links between the VAFN drive units 70 and the VAFN actuators 66.

The decoupling drive train 100 connecting the VAFN drive unit 70 and the VAFN actuators 66 may comprise a first coupling component 102 connected to the VAFN drive unit 70 and a second coupling component 104 connected to and configured to drive at least one of the VAFN actuators 66. The first and second coupling components 102,104 may be configured to detachably mate with each other when the translating thrust reverser sleeve 52 is in the stowed position, as illustrated in FIGS. 9 and 10, and may be configured to separate from each other when the translating thrust reverser sleeve 52 is in the deployed position, as illustrated in FIG. 11. The coupling components may be configured to electrically, mechanically, and/or hydraulically couple the VAFN actuators 66 with the VAFN drive unit 70 or other power and/or control sources described herein.

The decoupling drive train 100 may further comprise or be coupled with a position locking device 106, such that when the translating thrust reverser sleeve 52 is deployed, the VAFN actuators 66 and/or the second coupling component 104 are locked from rotation or actuation. The position locking device 106 may be an electric or pressure-activated brake/lock device or any other position locking device for preventing actuation of the VAFN panel 58 when the first and second coupling components 102,104 are disconnected.

In some embodiments of the invention, the decoupling drive train 100 comprises both power generation and transmission components, actuation components, and coupling components. For example, the decoupling drive train 100 may broadly comprise the VAFN drive unit 70, the first and second coupling components 102,104, the position locking device 106, and the VAFN actuators 66, which work together to drive translation of the VAFN panel 58.

Example Electro-Mechanical Decoupling Drive Train

Example electro-mechanical embodiments of the decoupling drive trains 100 are described below and illustrated in FIGS. 12-21. In some embodiments of the invention, the VAFN drive unit 70 may mechanically rotate the first coupling component 102, causing the second coupling component 104 to also rotate and thereby drive the VAFN actuators 66 when the first and second coupling components 102,104 are engaged with each other. For example, the first coupling component 102 may be a female connector and the second coupling component 104 may be a male connector, or vice versa, and may be substantially "self aligning." Self-aligning, as used herein, may refer to any shape or configuration that guides its mating part into a center alignment, when substantially laterally moved toward each other, such as one cone sliding into another. For example, the first coupling component 102 may have a substantially tapered hollow cone shaped indention with protrusions such as keys, teeth, or ribs located therein, and the second coupling component 104 may have a substantially tapered cone shaped protrusion having keys, teeth, or ribs extended therefrom. When the translating thrust reverser sleeve 52 is in the stowed position, the first and second coupling components 102,104 may interdigitate in such a manner that rotation motion of one of the coupling components 102,104 causes the other of the coupling components 104,102 to rotate therewith.

Figure 12:
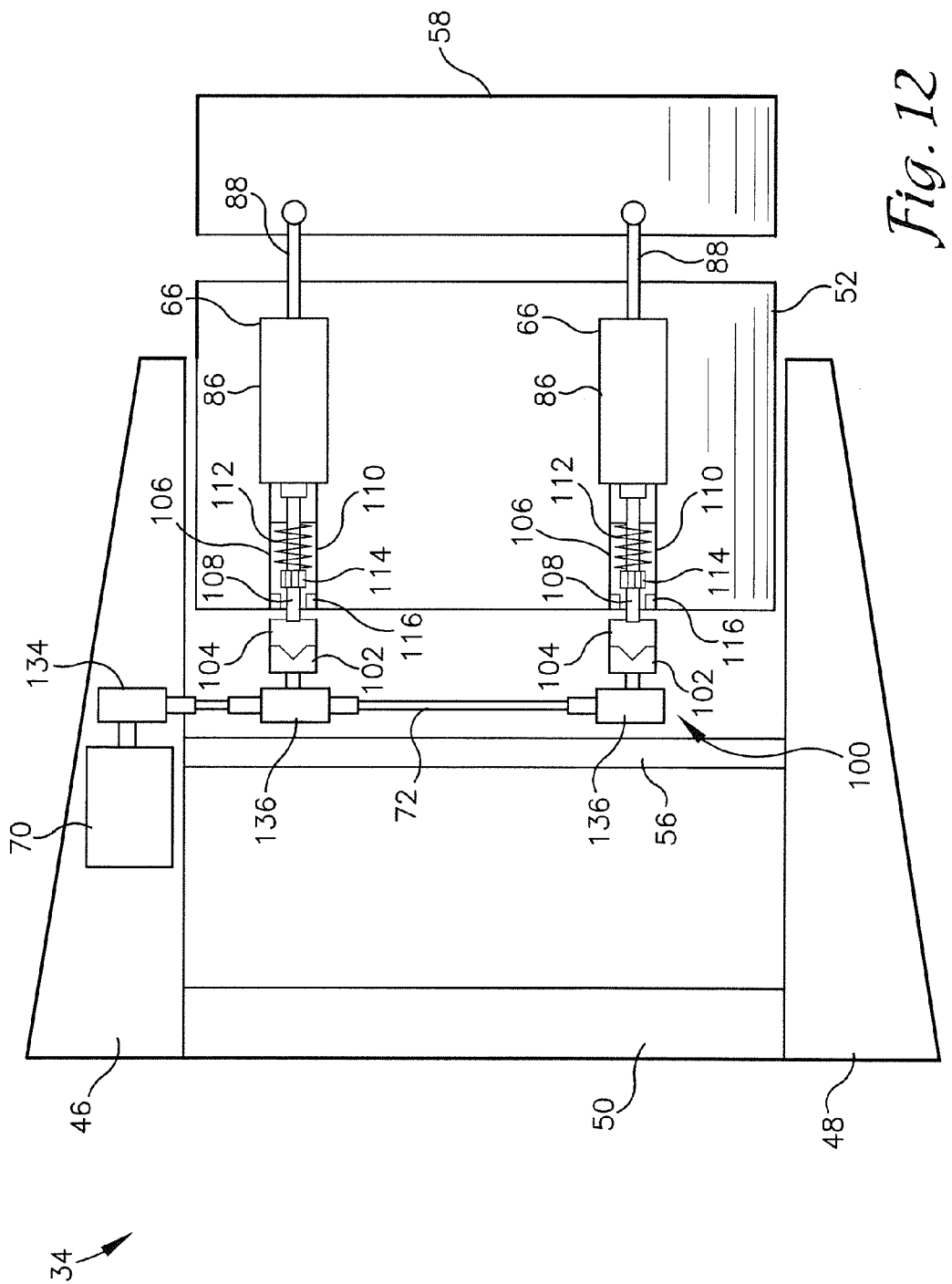
FIG. 12 is a schematic cross-sectional view of a thrust reverser half of the nacelle of FIG. 1 and illustrates the translating VAFN panel in the deployed position and the translating thrust reverser sleeve in the stowed position.
Figure 13:
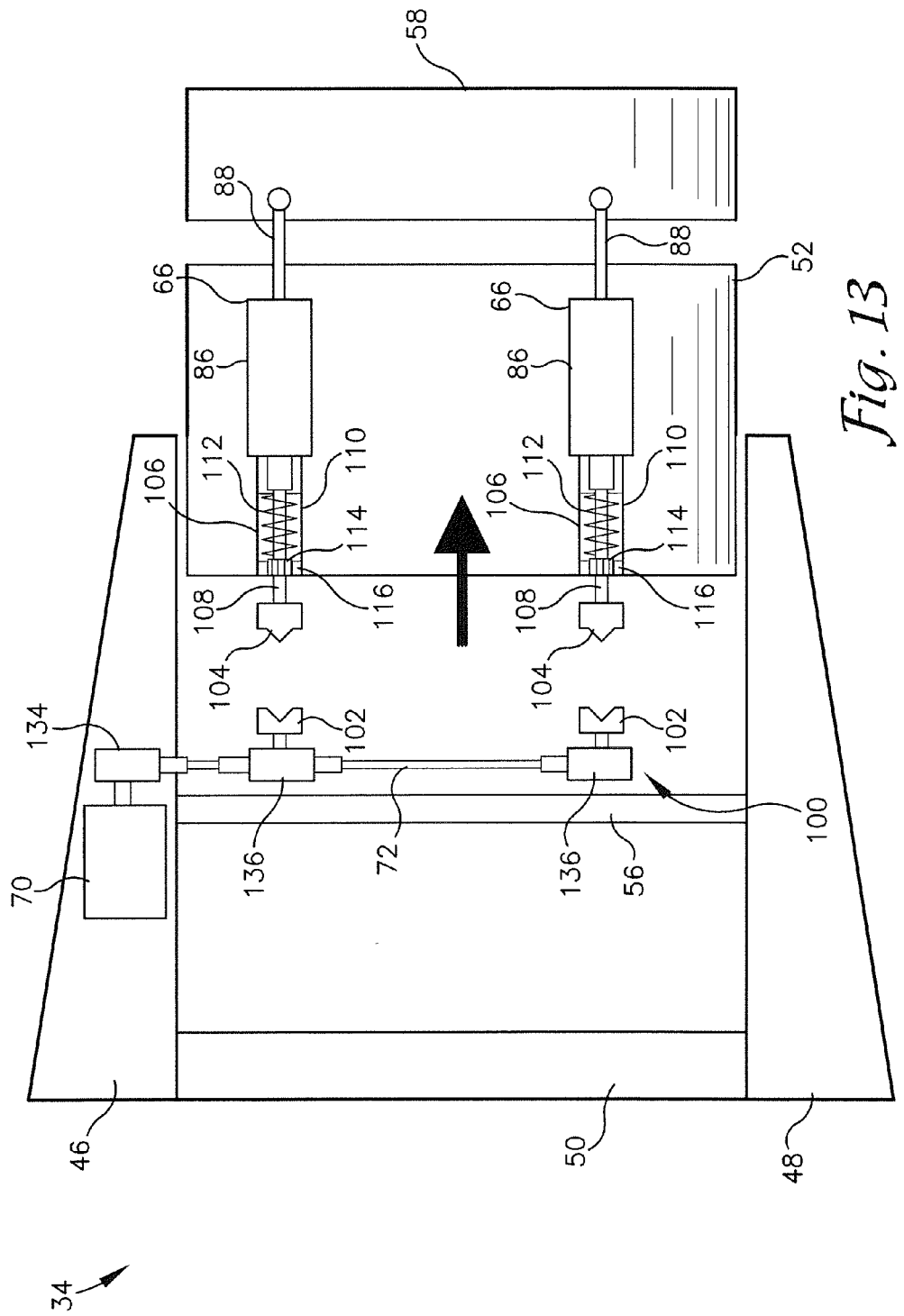
FIG. 13 is a schematic cross-sectional view of the thrust reverser half of the nacelle of FIG. 12 and illustrates the translating VAFN panel in the deployed position and the translating thrust reverser sleeve in the deployed position.
Figure 14:
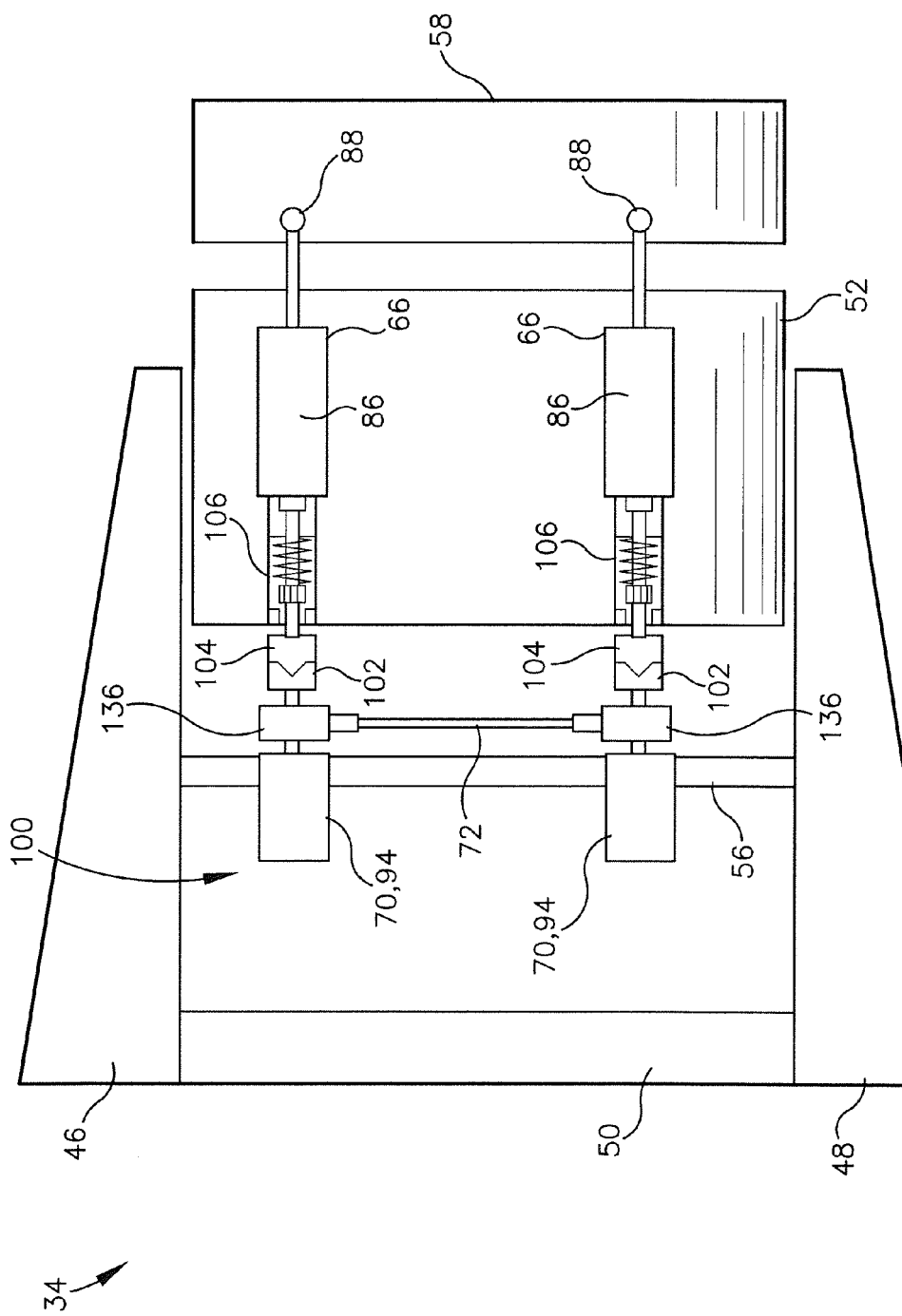
FIG. 14 is a schematic cross-sectional view of an alternative embodiment of the thrust reverser half of FIG. 12 comprising two VAFN drive units.

The position locking device 106, as illustrated in FIGS. 12-14, may be coupled to the second coupling component 104 and may comprise a translating locking rod 108, a hollow locking shaft 110, and a locking biasing member 112. Specifically, the second coupling component 104 may be attached to an end of the translating locking rod 108. The translating locking rod 108 may also be operably coupled with the translating element 88 of a corresponding one of the VAFN actuators 66 via a sliding spline interface 105. For example, the actuator drive shaft of one of the VAFN actuators 66 may be coupled with the translating locking rod 108, such that rotation of the translating locking rod 108 via the second coupling component 104 causes translation of the translating element 88 of the VAFN actuator 66.

The translating locking rod 108 may be slidable into and out of the hollow locking shaft 110, which may be fixed to the fixed element 86 of one of the VAFN actuators 66 and/or to the translating thrust reverser sleeve 52. The lock biasing member 112, such as a spring, may be housed within the hollow locking shaft 110 and may be compressed when the translating locking rod 108 is pressed into the hollow locking shaft 110, as illustrated in FIG. 12. Likewise, the lock biasing member 112 may be released from compression or otherwise extend when the translating locking rod 108 and the VAFN actuator 66 are not pressed toward each other, as in FIG. 13. Specifically, at least one first locking protrusion 114 extending radially from the translating locking rod 108 within the hollow locking shaft 110 may be configured to interface with the lock biasing member 112. The location of the first locking protrusion 114 within the hollow locking shaft 110 may determine the amount of compression of the lock biasing member 112 and vise versa. Furthermore, when the lock biasing member 112 is fully extended to its naturally biased position, the first locking protrusion 114 may be configured to engage with at least one second locking protrusion 116 extending inwardly from inner walls of the hollow locking shaft 110, as illustrated in FIG. 13. For example, the first locking protrusion 114 may be a ring of keys or gear teeth protruding radially in a direction toward the inner walls of the hollow locking shaft 110, and the second locking protrusion 116 may be a ring of keys or gear teeth protruding radially in a direction toward the translating locking shaft 108 and configured to engage with the keys or gear teeth of the first locking protrusion 114 when aligned therewith, as illustrated in FIG. 13.

Figure 15:
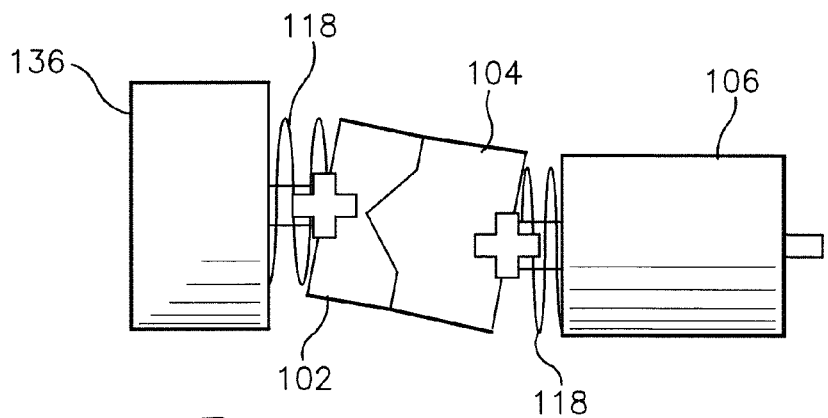
FIG. 15 is a schematic side view of first and second coupling components pivotally joined and spring-biased relative to components of the thrust reverser half of FIG. 12.

In some embodiments of the invention, the first coupling component 102 may be fixed relative to the hinge beam 46, the latch beam 48, the torque box 50, or some other non-translating structure of the nacelle 10 and the second coupling component 104 may be fixed to or fixed relative to the translating thrust reverser sleeve 52. However, in alternative embodiments of the invention, as illustrated in FIG. 15, the first and/or second coupling components 102,104 may be attached to their respective nacelle 10 components via pivoting joints and/or biasing members such as springs, providing some give in the precision of the lateral alignment required of the first and second coupling components 102,104. For example, biasing springs 118 on each of the first and second coupling components 102,104 may insure that engagement features of the coupling components 102,104 are positioned within a predefined cone to enable engagement. However, other floating interfaces and flex-tolerant interfaces may be used to attach the first and second coupling components 102, 104 to their respective nacelle 10 components without departing from the scope of the invention. Additionally, small forward and aft deflections may be accommodated by telescoping features, such as the translating locking rod 108 described above, for attaching the second coupling component 104 with one of the VAFN actuators 66. In other example embodiments of the invention, elastic spacers may be incorporated between the first and second coupling components 102,104 for further flexibility and tolerance of small forward and aft deflections.

Figure 16:
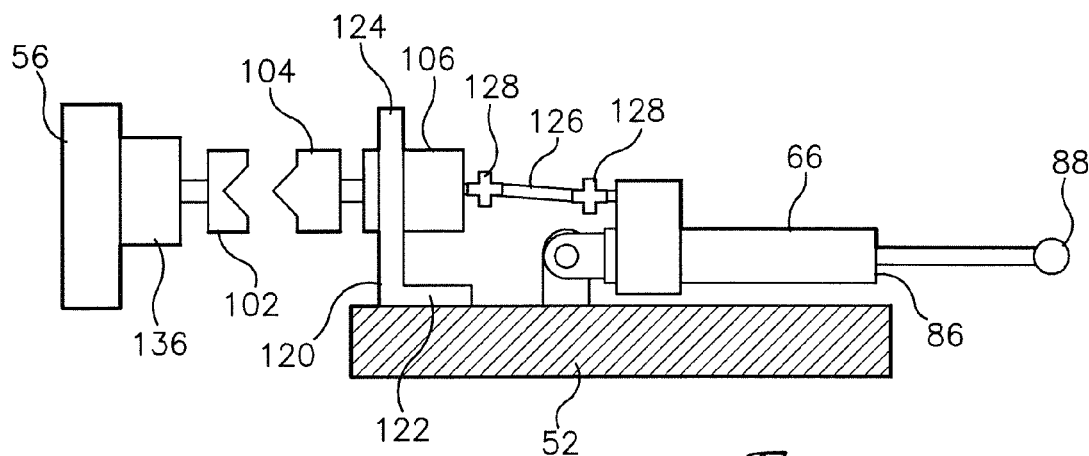
FIG. 16 is a schematic cross-sectional view of the first and second coupling components, as well as a VAFN actuator mounted on the translating thrust reverser sleeve of FIG. 12 and a position locking device operably coupled with the VAFN actuator by an intermediate drive shaft.
Figure 17:
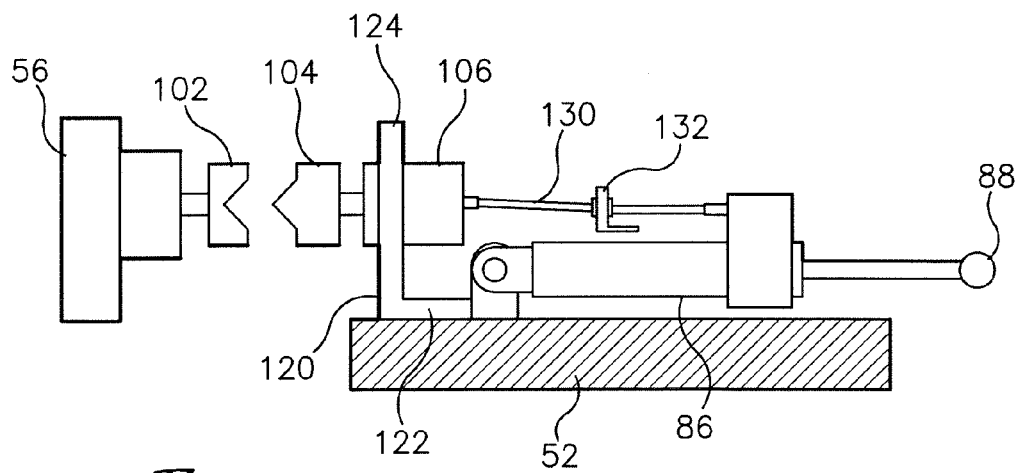
FIG. 17 is a schematic cross-sectional view of the first and second coupling components, as well as the VAFN actuator and the position locking device of FIG. 16 operably coupled with each other by a flex-drive shaft or cable.

To accommodate for relative movement between the fixed components of the nacelle 10 and the translating thrust reverser sleeve 52, a floating support 120 may be used to suspend the position locking device 106 from the translating thrust reverser sleeve 52. For example, as illustrated in FIGS. 16 and 17, the floating support 120 mounted to the translating thrust reverser sleeve 52 may suspend the hollow locking shaft 110 of the position locking device 106 a distance away from the translating thrust reverser sleeve 52. The floating support 120 may comprise, for example, a rigid L-shaped component with a first flange 122 fixed to the translating thrust reverser sleeve 52 and a second flange 124 extending substantially perpendicular from the first flange 122 and having an opening formed therethrough. The hollow locking shaft 110 may extend through the opening. A circumferential spring or elastic support may be positioned within the opening between the second flange 124 and the hollow locking shaft 110. The circumferential spring or elastic support may thereby suspend the second coupling component 104 when the translating thrust reverser sleeve 52 is deployed, but also may allow radial movement of the second coupling component 104 to self-align during engagement with the first coupling component 102. The circumferential spring or elastic support also allows relative movement between the translating thrust reverser sleeve 52 and the non-translating components of the nacelle 10. Alternatively, a spring-suspended gimbal support or any other suitable floating support may be used to allow radial movement—both vertical and lateral float—of the position locking device 106. In some embodiments of the invention, anti-rotation features may be spaced radially within the opening through the second flange 124 of the rigid L-shaped component and corresponding anti-rotation features may be provided on an outer surface of the hollow locking shaft 110 to restrain the position locking device 106 from rotating relative to the floating support 120.

Embodiments of the invention using the floating support 120 may also comprise an intermediate drive shaft 126—a rigid rotatable rod which may extend between the position locking device 106 and one of the VAFN actuators 66. Specifically, universal joints 128 (i.e., u-joints) may couple the intermediate drive shaft 126 with the translating locking rod 108 at one end of the intermediate drive shaft 126 and may couple the intermediate drive shaft 126 with the actuator drive shaft of one of the VAFN actuators 66, as illustrated in FIG. 16. The intermediate drive shaft 126 may transfer rotation from the second coupling component 104 and translating locking rod 108 to the actuator drive shaft or other rotatably-actuated components of one of the VAFN actuators 66. Additionally or alternatively, a flex-drive shaft 130 (e.g., cable) may also be used between the position locking device 106 and one of the VAFN actuators 66 to provide power therebetween. Furthermore, an intermediate roller bearing support 132 may be used to control unwanted vibration of the flex-drive shaft 130, as illustrated in FIG. 17.

Example Drive Unit/Actuator Configurations

The drive units 68,70 and the actuators 64,66 described above may be arranged in a variety of configurations, as described below. In some embodiments of the invention, as illustrated in FIG. 12, the VAFN drive unit 70 and/or the motor 94 may be coupled to a primary power transmission gearbox 134 and linked to several other secondary power transmission gearboxes 136 via the interconnect shafts 72. The VAFN drive unit 70 and the primary power transmission gearbox 134 both may be fixed to the latch beam 48. The secondary power transmission gearboxes 136 may be coupled with the first coupling component 102 in such a manner that the VAFN drive unit 70 actuates rotational motion of the first coupling component 102 via the interconnect shafts 72 and the primary power transmission gearbox 134. The first coupling component 102 may be positioned and aligned with the second coupling component 104 attached to the actuator drive shaft of one of the VAFN actuators 66. When the translating thrust reverser sleeve 52 is in the stowed position, the first and second coupling components 102,104 may be physically coupled, such that rotation of the first coupling component 102 causes rotation of the second coupling component 104 connected therewith. When the translating thrust reverser sleeve 52 is deployed, the second coupling component 104 is also translated away from the first coupling component 102, as described above.

Figure 18:
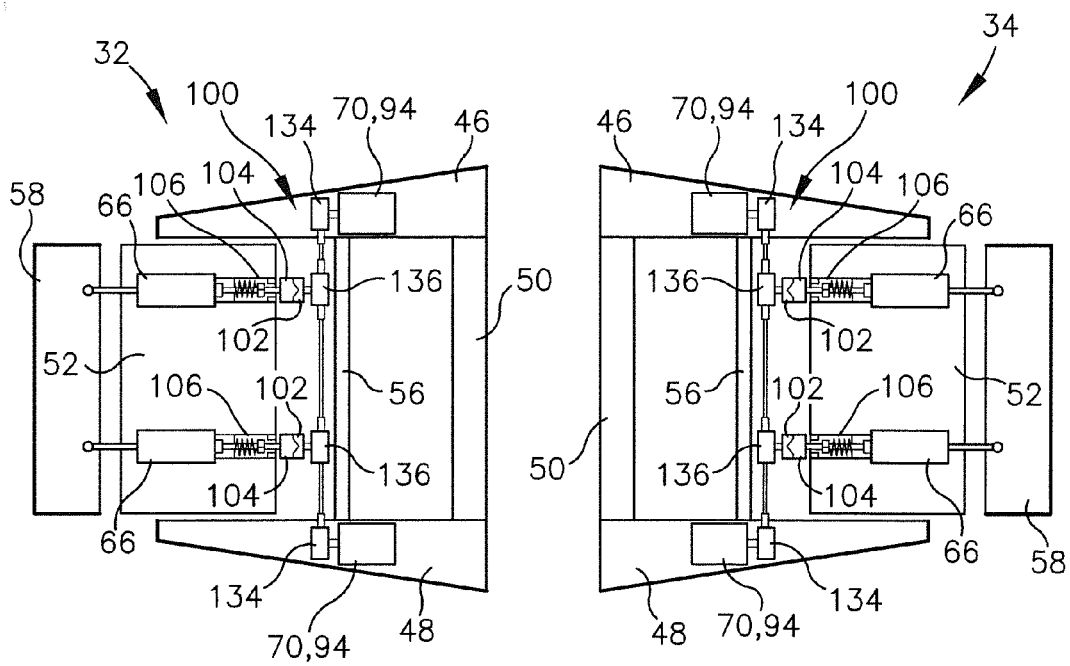
FIG. 18 is a schematic cross-sectional view of two of the thrust reverser halves similar in configuration to the thrust reverser half of FIG. 12, with additional redundant motors added to drive the VAFN actuators.

In other embodiments of the invention, as illustrate in FIG. 18, two of the VAFN drive units 70 and/or two of the motors 94 may be mounted on each thrust reverser half 32,34, one on the latch beam 48 and one on the hinge beam 46. In this configuration, each of the VAFN drive units 70 may be coupled to one of at least two primary power transmission gearboxes 134 also attached to the latch beam 48 or the hinge beam 46. As in the previous embodiment of the invention, secondary power transmission gearboxes 136 may be coupled with the VAFN drive units 70 via the primary transmission gearboxes 134 and the interconnect shafts 72 extending between and coupled with rotary components of the primary transmission gearboxes 134 and the secondary transmission gearboxes 136.

A clutch/brake assembly (not shown) may be used with each of the VAFN drive units 70 or motors 94 to engage or disengage with the primary power transmission gearboxes 134. If either one of the VAFN drive units 70 or motors 94 fails, the clutch/brake assembly associated therewith may be released, allowing the remaining VAFN drive unit 70 or motor 94 to drive the VAFN actuators 66 without the mechanical drag of an inoperable one of the VAFN drive units 70 or motors 94. The VAFN drive units 70 or motors 94 on each of the thrust reverser halves 32,34 may be synchronized with each other electronically or in any manner known in the art. For example, sensors for detecting power and/or speed of the VAFN drive units 70 may be integrated with the clutch/brake assembly and may provide feedback for controlling and synchronizing the power and/or speed of the VAFN drive units 70. Alternatively, sensing and feedback of a true position of the translating elements 88 of the VAFN actuators 66 may be used to synchronize the VAFN drive units 70.

In some embodiments of the invention, as illustrated in FIG. 19, the VAFN drive units 70 of each of the thrust reverser halves 32,34 may be coupled or otherwise interconnected at the latch beam 48 or the hinge beam 46. For example, a cross-over power transmission shaft 138 may be used to electrically and/or rotatably connect the VAFN drive units 70 of the thrust reverser halves 32,34. In this configuration, each of the VAFN drive units 70 may become a back-up for the other. The cross-over power transmission shaft 138 may be a fixed coupling, attached to a fixed component of the nacelle 10 or the pylon 12. The cross-over power transmission shaft 138 or fixed coupling may comprise or be coupled with flexible shafts 140. The flexible shafts 140 may couple with the VAFN drive units 70 from the thrust reverser halves 32,34. The flexibility of the flexible shafts 140 may allow the thrust reverser halves 32,34 to be released at the latch beams 48 and pivoted open at the hinge beams 46 for engine servicing.

In some embodiments of the invention, the VAFN drive units 70 located on the latch beams 48 of each of the thrust reverser halves 32,34 may be interconnected using self-aligning coupling components 142, which may include the first and second coupling components 102,104 and the position locking device 106 described above. Alternatively, as illustrated in FIG. 19 secondary power transmission gearboxes 136 of each of the thrust reverser halves 32,34 may be interconnected using the self-aligning coupling components 142. This may allow the thrust reverser halves 32,34 to be opened and may allow for relative movement between the thrust reverser halves 32,34 during normal operation while also allowing the rotary motion of the secondary power transmission gearboxes 136 to be interconnected or synchronized between the two thrust reverser halves 32,34. While interconnection of the thrust reverser halves' rotary elements is shown at both the hinge beam 46 and the latch beam 48 locations in FIG. 19, some embodiments of the invention may include only one or the other of these interconnecting features (e.g., the cross-over power transmission shaft 138 or the self-aligning coupling components 142) without departing from the scope of the invention.

Figure 20:
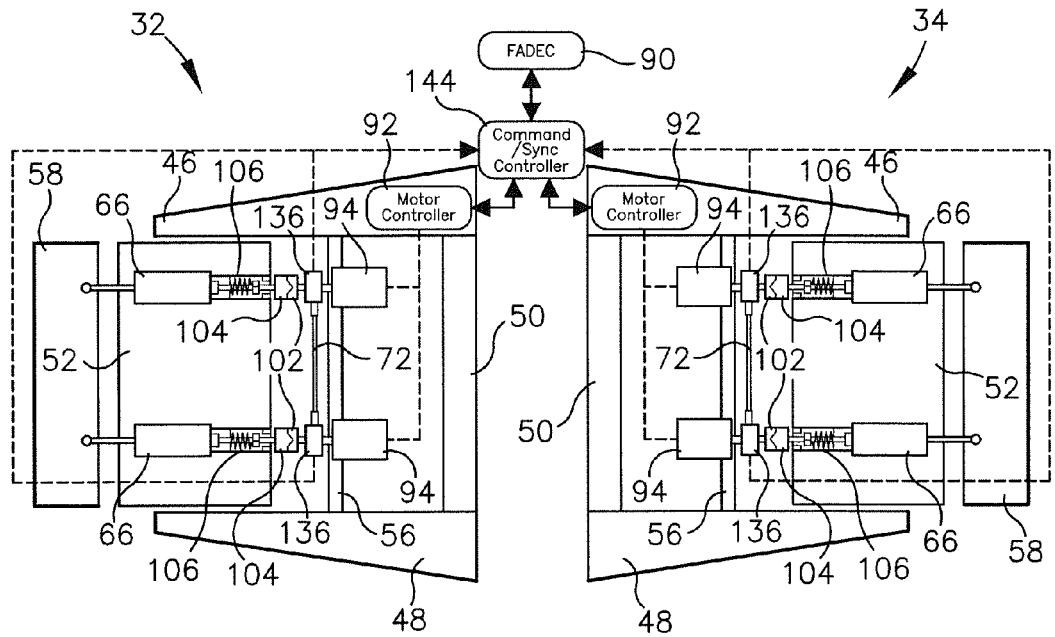
FIG. 20 is a schematic cross-sectional view of two thrust reverser halves similar in configuration to the thrust reverser half of FIG. 14, illustrating communication flow between a full authority digital engine control (FADEC) system, a command/sync controller, and motor controllers of the VAFN drive units, as well as sensor feedback signals received by the command/sync controller.
Figure 21:
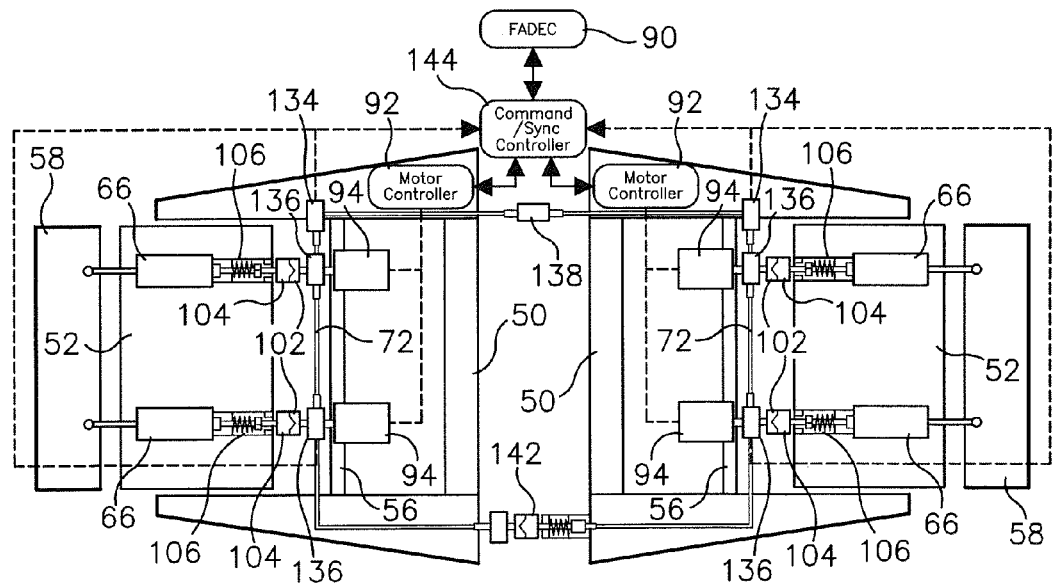
FIG. 21 is a schematic cross-sectional view of the two thrust reverser halves of FIG. 20, with the addition of the cross-over power transmission shaft and the self-aligning coupling components rotatably coupling motors of the two thrust reverser halves.

In some embodiments of the invention, as illustrated in FIGS. 20-21, the VAFN drive units 70 may be coupled directly with the secondary power transmission gearboxes 136 and fixed to the torque box 50 and/or the cascade support ring 56. Command and control signals may be sent from the motor controller 92, which may be fixed to the hinge beam 46 or any other structure of the nacelle 10 or aircraft, to the motors 94 or VAFN drive units 70. In some embodiments of the invention, there may be one motor controller 92 communicably coupled with the motors 94 of each of the thrust reverser halves 32,34. Both of the motor controllers 92 may be communicably coupled to send and receive information to and from a command/sync controller 144 and/or the FADEC system 90 of the aircraft. In some embodiments of the invention, the command/sync controller 144 may receive feedback information sensed from the secondary power transmission gearboxes 136 of each of the thrust reverser halves 32,34, such that the motors 94 on each of the thrust reverser halves 32,34 may be synchronized with each other.

The use of the actuation and drive train configurations described above may depend on the various types of failures that must be accommodated by a particular type of thrust reverser and VAFN system. Other configurations with various quantities of drive units and actuators may be used without departing from the scope of the invention.

Example Electrical Decoupling Drive Train

As an alternative to the electro-mechanical embodiments of the decoupling drive trains 100 described above, examples of the present invention comprising electrical embodiments of the decoupling drive trains 100 are described below and illustrated in FIGS. 22-24. In electrical embodiments of the decoupling drive trains 100, the first and second coupling components 102,104 may transfer electrical power to the VAFN actuators 66 instead of rotary mechanical power.

For example, the motor controller 92 of the VAFN drive unit 70 may be fixed to the hinge beam 46 and electrically coupled with one or more of the first coupling components 102 attached to the cascade support ring 56 or some other non-translating component of the nacelle 10. The first coupling components 102 may each be positioned to align with and electrically engage with one or more of the second coupling components 104 fixed to the translating thrust reverser sleeve 52 and electrically coupled to one or more of the motors 94 of the VAFN drive unit 70. In this embodiment of the invention, as illustrated in FIGS. 22 and 23, the motors 94 may be fixed to the translating thrust reverser sleeve 52 and directly coupled with the VAFN actuators 66. Furthermore, electrical embodiments of the first and second coupling components 102,104 may comprise a shielding, such as a dust boot or self-sealing interface, to protect contact points from contamination while uncoupled. The first and second coupling components 102,104 of FIGS. 22-24 may also be self-aligning and configured to float with the relative movement between the non-translating components of the nacelle 10 and the translating thrust reverser sleeve 52 during operation thereof, using configurations similar to those described in the electro-mechanical embodiments of the decoupling drive train 100 above.

An electrical embodiment of the position locking device 106 may be associated with each of the motors 94 and/or VAFN actuators 66 and may be configured to lock the position of the VAFN actuators 66 and/or the VAFN panel 58 when power is disconnected therefrom by separation of the first and second coupling components 102,104. Furthermore, rotary power transmission elements, such as the interconnect shafts 72 described above, may extend between and rotatably couple rotary components of the VAFN actuators 66 to improve the reliability thereof.

The quantity of first and second coupling components 102, 104 and therefore the quantity of electrical paths provided between the motor controller 92 and the motors 94, may depend on the redundancy needed for each of the thrust reverser halves 32,34 to accommodate various potential failure modes. In some embodiments of the invention, the motor controller 92 may use sensor readings to compare each pair of the first and second coupling components 102,104 and use the best detected electrical path through either pair of coupling components 102,104 to control the motors 94 and VAFN actuators 66.

In some alternative embodiments of the invention, the motor controller 92 may also be mounted on the translating thrust reverser sleeve 52, as illustrated in FIG. 24, and may receive both power and control signals from the FADEC system 90 and/or the command/sync controller 144 of the aircraft via engagement between the first and second coupling components 102,104. In this embodiment of the invention, the motor controller 92 may be directly coupled with the motors 94 of the VAFN drive units 70.

Example Contactless Decoupling Drive Train

In some embodiments of the invention, the VAFN actuators 66 may be linear electric motor actuators (e.g., contactless actuators). In this embodiment of the invention, as illustrated in FIG. 25, a separate motor is not required, and the linear electric motor actuators may be electrically coupled to the motor controller 92 via the first and second coupling components 102,104. Unlike the electric motor-driven jack-screw linear actuators described above, the linear electric motor actuators have no physical connection between its fixed element 86 and its translating element 88. Furthermore, no reduction gearboxes or rotary screw mechanism is used to produce linear motion with the linear electric motor actuators, so the mechanical friction of the mechanism is greatly reduced. The linear electric motor actuators also do not produce any actuator resistance to movement of the VAFN panel 58 should one of the linear electric motor actuators fail.

In this embodiment of the invention, the first and second coupling components 102,104 may be induction coupling components used to transmit power between the motor controller 92, or other control systems of the aircraft, and the VAFN actuators 66. Specifically, the first and second coupling components 102,104 may transmit power therebetween by magnetic fields induced between a primary coil on the first coupling component 102 and a secondary coil on the second coupling component 104. The first and second coupling components 102,104 may be required to move within a threshold distance apart from each other in order to transmit power therebetween. Advantageously, because no contact is required to transmit electrical power in this manner, there are no contact points that would degrade over time due to wear or exposure to contaminants. The first and second coupling components 102,104 of FIG. 25 may also be self-aligning and configured to float with the relative movement between the non-translating components of the nacelle 10 and the translating thrust reverser sleeve 52 during operation thereof, using configurations similar to those described in the electro-mechanical embodiments of the decoupling drive train 100 above.

In Operation

In operation, the VAFN panel 58 may be actuated from the stowed position to the deployed position, and any position between the stowed and deployed positions, with the first and second coupling components 102,104 remaining in contact. However, when the translating thrust reverser sleeve 52 is actuated from the stowed position to the deployed position, the second coupling component 104 is pulled away from the first coupling component 102, physically and operationally separating the coupling components 102,104. The position locking devices 106 lock when the first and second coupling components 102,104 are separated, thereby preventing unintended actuation of the VAFN actuators 66 and/or the VAFN panel 58.

In the electro-mechanical drive train embodiments of the invention, when the translating thrust reverser sleeve 52 is in the stowed position, the translating locking rod 108 is pressed further into the hollow locking shaft 110 by the first coupling component 102 pressing against the second coupling component 104 attached to the translating locking rod 108. By pressing the translating locking rod 108 into the hollow locking shaft 110, the first locking protrusion 114 is also pressed further into the hollow locking shaft 110 a space away from the second locking protrusion 116 such that the first locking protrusion 114 does not impede rotation of the translating locking rod 108. The pressing of the translating locking rod 108 and the first locking protrusion 114 further into the hollow locking shaft 110 compresses the lock biasing member 112 or spring. When the translating thrust reverser sleeve 52 is in the deployed position, the second coupling component 104 is pulled away from the first coupling component 102. Without the pressure of the first coupling component 102 pressed against the second coupling component 104, the lock biasing member 112 is free to extend to its normally-biased position, in which the lock biasing member 112 presses the first locking protrusion 114 into engagement with the second locking protrusion 112, thereby locking rotation of the actuator drive shaft of the VAFN actuator 66 and thus preventing forward and aft translation of the translating element 88 of the VAFN actuator 66.

Figure 23:
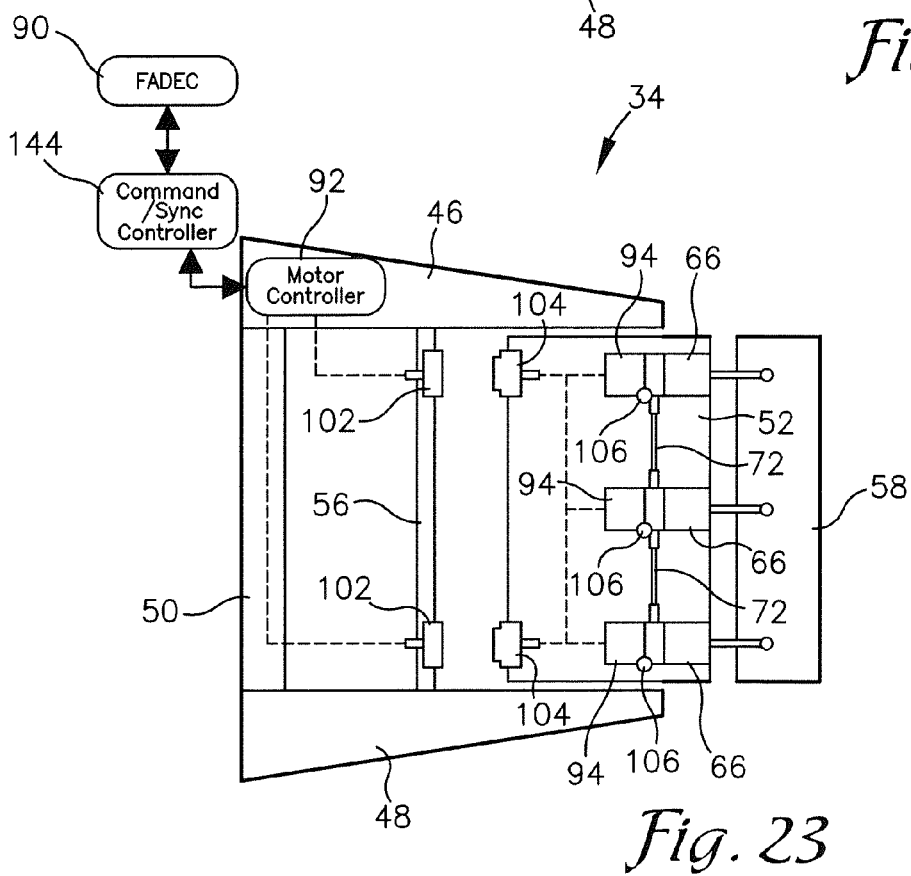
FIG. 23 is a schematic cross-sectional view of the thrust reverser half of FIG. 22 with the translating thrust reverser sleeve in the deployed position.

In the electrical drive train embodiments of the invention, as illustrated in FIGS. 22-24, when the translating thrust reverser sleeve 52 is actuated to the deployed position, the first and second coupling components 102,104 are disengaged from each other, interrupting the electrical power and command signal path between either the motor controller 92 and the motors 94, or the FADEC system 90 or command/sync controller 144 and the motor controller 92. When the translating thrust reverser sleeve 52 is deployed, power is thereby shut off to the position locking device 106, which consequently engages to prevent the VAFN actuators 66 from actuating and thus prevents the VAFN panel 58 from changing positions during deployment of the translating thrust reverser sleeve 52.

In some alternative embodiments of the invention, if the VAFN actuators 66 are hydraulically-powered, a pressurized reservoir or accumulator may be used to allow a one-time positioning of the VAFN panel 58 to its deployed fail-safe position. Alternatively, in a two-motor configuration, one of the motors 94 or VAFN drive units 70 may be electric and one may be hydraulic. The electric motor may be connected to an aircraft power source. By selective engaging and disengaging of each motor clutch/brake assembly, an operable one of the motors 94 may be connected to the VAFN actuators 66 or drive train 70. In some embodiments of the invention, any electric motor back-up to a hydraulic motor may drive the VAFN panel 58 to its deployed fail-safe position if the hydraulic motor becomes inoperable.

In some embodiments of the invention, various motion/position sensors, such as the position sensors 62 described above, may be used to prevent translation of the VAFN panel 58 if one of the VAFN actuators 66 is inoperable. Furthermore, commandable release mechanisms may be used between the VAFN actuators 66 and the VAFN panel 58 to disconnect the VAFN panel 58 from inoperable ones of the VAFN actuators 66, allowing the VAFN panel 58 to be translated. If a loss of aircraft power occurs, back-up battery power or other emergency power sources may be used to actuate the VAFN panel 58 to its deployed position, which is also its fail-safe position. This position allows increased flow through the fan duct, reducing ram drag of an engine-out condition. This may also be beneficial for an in-flight engine re-start.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A nacelle of an aircraft, the nacelle comprising:
    a fixed structure configured to be fixed relative to a pylon of the aircraft;
    a translating thrust reverser sleeve translatable aftward, relative to the fixed structure, from a first stowed position to a first deployed position;
    a translating variable area fan nozzle (VAFN) panel translatable aftward, relative to the translating thrust reverser sleeve, from a second stowed position to a second deployed position;
    a VAFN actuator comprising a fixed element mounted to the translating thrust reverser sleeve and a translatable element fixed to the translating VAFN panel and configured to actuate the translating VAFN panel between the second stowed position and the second deployed position;
    a VAFN drive unit mounted to the fixed structure and configured to provide at least one of electric power, hydraulic force, and mechanical force to the VAFN actuator;
    a decoupling drive train configured to electrically, hydraulically, or mechanically couple the VAFN drive unit and the VAFN actuator when the translating thrust reverser sleeve is in the first stowed position and configured to decouple the VAFN drive unit from the VAFN actuator when the translating thrust reverser sleeve is in the first deployed position;
    wherein the decoupling drive train comprises a first coupling component fixed to the fixed structure and operationally coupled with the VAFN drive unit and a second coupling component operationally coupled with the VAFN actuator and configured to engage with the first coupling component when the translating thrust reverser sleeve is in the first stowed position and configured to decouple and spatially separate from the first coupling component when the translating thrust reverser sleeve is ion the first deployed position;
    further comprising a position locking device coupling the second coupling component with the VAFN actuator, wherein the position locking device is configured to prevent movement of the translating element of the VAFN actuator when the second coupling component is not engaged with the first coupling component; and
    wherein the position locking device comprises:
    a translating locking rod fixed to the second coupling component and configured to translate and rotate relative to the translating thrust reverser sleeve and to rotatably drive the VAFN actuator, the translating locking rod comprising first locking protrusions extending radially outward from the translating locking rod;
    a hollow locking shaft mounted on the translating thrust reverser sleeve, the hollow locking shaft having an aft opening and a forward opening opposite of the aft opening and comprising second locking protrusions extending radially inward from the hollow locking shaft at or proximate to the forward opening thereof, wherein a portion of the translating locking rod is positioned within and extends through the hollow locking shaft and the forward and aft openings thereof; and
    a locking biasing member associated with the translating locking rod and positioned within the hollow locking shaft, the locking biasing member configured to be compressed toward the aft opening by the first locking protrusions when the translating thrust reverser is in the first stowed position and to naturally bias the first locking protrusions into engagement with the second locking protrusions when the translating thrust reverser is in the first deployed position, thereby prevent rotation of the translating locking rod.

2. The nacelle of claim 1, wherein the fixed structure is at least one of a hinge beam, a latch beam, a torque box, and a cascade support ring.

3. The nacelle of claim 1, wherein the first coupling component and the second coupling component are configured with mating surfaces having substantially tapered shapes, such that the first coupling component and the second coupling component are substantially self-aligning.

4. The nacelle of claim 1, further comprising a floating support configured for mounting the hollow locking shaft to the translating thrust reverser sleeve to accommodate for relative movement between the fixed structure and the translating thrust reverser sleeve.

5. The nacelle of claim 1, further comprising a rigid or flexible drive shaft configured to rotatably connect the translating locking rod with the VAFN actuator and to rotatably drive the VAFN actuator.

6. The nacelle of claim 1, wherein the VAFN drive unit comprises a motor and a motor controller.

7. The nacelle of claim 1, further comprising a position sensor configured for sensing a position of at least one of the translating thrust reverser sleeve and the translating VAFN panel.

8. The nacelle of claim 7, wherein the position sensor is a linear variable transducer (LVT) device comprising:
    a translating sensor attached to the fixed structure;
    a resilient member associated with the translating sensor and configured to be compressed when the translating thrust reverser sleeve is in the first stowed position and the translating VAFN panel is in the second stowed position and to be expanded to a naturally biased position when at least one of the translating thrust reverser sleeve and the translating VAFN panel are in the first or second deployed position, respectively;

a first LVT target located at an aft end of the translating sensor; and a second LVT target mounted to the translating VAFN panel and configured to engage the first LVT target when the translating thrust reverser sleeve is in the first stowed position and the translating VAFN panel is in the second stowed or second deployed position.

* * * * *